United States Patent
Madukkakuzhy et al.

(10) Patent No.: US 12,247,495 B2
(45) Date of Patent: Mar. 11, 2025

(54) SYSTEM HAVING AXIAL-RADIAL EXHAUST DIFFUSER AND METHOD OF USE

(71) Applicant: General Electric Company, Schenectady, NY (US)

(72) Inventors: Felix Abraham Madukkakuzhy, Kottayam (IN); Joshy John, Bengaluru (IN); Bala Muralidhar Singh Bahadur, Bengaluru (IN); Sanjeev Kumar Jain, Bengaluru (IN)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/217,108

(22) Filed: Jun. 30, 2023

(65) Prior Publication Data

US 2024/0360774 A1    Oct. 31, 2024

(30) Foreign Application Priority Data

Apr. 26, 2023    (IN) .............................. 202311030098

(51) Int. Cl.
| | | |
|---|---|---|
| *F01D 25/30* | (2006.01) | |
| *F01K 23/10* | (2006.01) | |
| *F02C 6/18* | (2006.01) | |

(52) U.S. Cl.
CPC .............. *F01D 25/30* (2013.01); *F01K 23/10* (2013.01); *F02C 6/18* (2013.01)

(58) Field of Classification Search
CPC ............. F01D 25/30; F01K 23/10; F02C 6/18
See application file for complete search history.

(56) References Cited

U.S. PATENT DOCUMENTS

| | | | |
|---|---|---|---|
| 9,631,542 B2 | 4/2017 | Subramaniyan et al. | |
| 2003/0192737 A1* | 10/2003 | Han .................. | F28F 9/0263 |
| | | | 181/224 |
| 2010/0071342 A1 | 3/2010 | Siden et al. | |
| 2012/0174586 A1 | 7/2012 | Alexander et al. | |
| 2015/0000292 A1 | 1/2015 | Subramaniyan et al. | |
| 2015/0204247 A1* | 7/2015 | Doebbeling ............ | F01K 23/10 |
| | | | 60/785 |
| 2015/0267565 A1* | 9/2015 | Tozzi ..................... | F01D 25/30 |
| | | | 415/211.2 |
| 2017/0211424 A1* | 7/2017 | Takeda ................... | F01D 25/30 |
| 2018/0058335 A1 | 3/2018 | Alexander et al. | |

(Continued)

OTHER PUBLICATIONS

European extended search report for EP Application No. 24169548.5, dated Aug. 9, 2024, 10 pgs.

*Primary Examiner* — Todd E Manahan
*Assistant Examiner* — Rene D Ford
(74) *Attorney, Agent, or Firm* — Fletcher Yoder, P.C.

(57) ABSTRACT

A system includes an exhaust diffuser system having an axial-radial diffuser and a transition duct. The axial-radial diffuser includes an inlet, an outlet, an axial diffuser portion between the inlet and the outlet, and a radial diffuser portion between the axial diffuser portion and the outlet, wherein the inlet is configured to couple to a gas turbine system. The transition duct is coupled to the axial-radial diffuser, wherein the outlet is disposed inside of an intake portion of the transition duct, and the transition duct includes a discharge portion configured to couple to a heat recovery steam generator (HRSG).

28 Claims, 7 Drawing Sheets

(56) References Cited

U.S. PATENT DOCUMENTS

| | | | |
|---|---|---|---|
| 2018/0216495 A1* | 8/2018 | Drezek | F01D 25/30 |
| 2019/0170010 A1* | 6/2019 | Stein | F01D 17/143 |
| 2019/0186300 A1* | 6/2019 | Nanda | F22B 1/1815 |
| 2020/0208540 A1* | 7/2020 | Rochin Machado | F01D 25/30 |
| 2023/0030721 A1* | 2/2023 | Siorek | F01D 25/30 |

\* cited by examiner

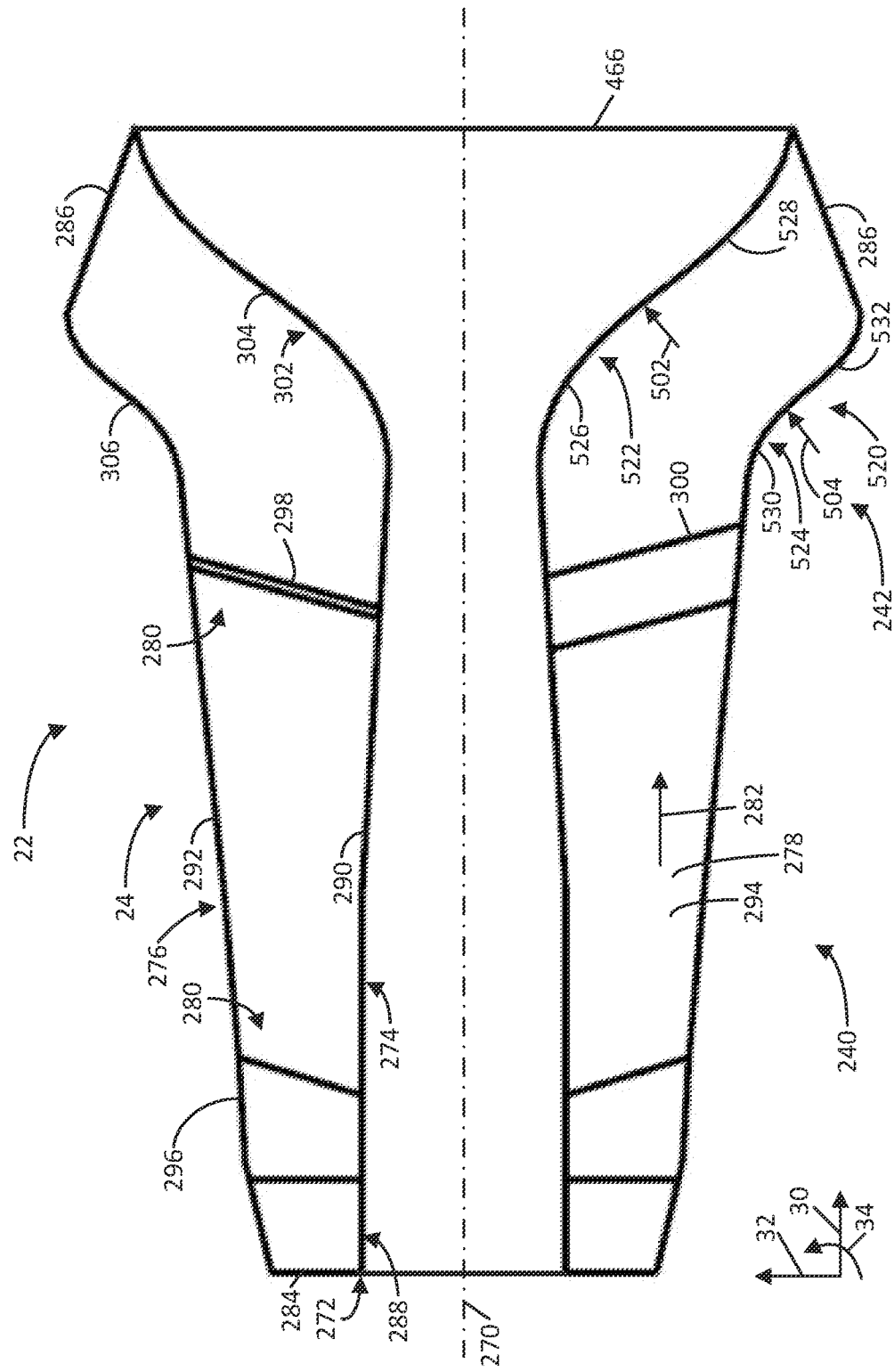

SYSTEM HAVING AXIAL-RADIAL EXHAUST DIFFUSER AND METHOD OF USE

CROSS-REFERENCE TO RELATED APPLICATION

This application claims priority to and benefit of India Application No. 202311030098, filed on Apr. 26, 2023; entitled "SYSTEM HAVING AXIAL-RADIAL EXHAUST DIFFUSER AND METHOD OF USE", which is herein incorporated by reference in its entirety.

BACKGROUND

The present application relates generally to a system and method for diffusing an exhaust gas from a gas turbine system for supply into a heat recovery steam generator (HRSG).

A combined cycle power plant routes an exhaust gas from a gas turbine system through an HRSG, which generates steam to drive a steam turbine system. Unfortunately, the HRSG may be spaced a considerable distance away from the gas turbine system to allow for exhaust diffusion upstream of the HRSG, thereby consuming valuable space at a site of the combined cycle power plant. With various regulations and environmental concerns regarding global warming, additional space is needed to add gas treatment equipment to reduce the output of undesirable gases present in the exhaust gas. For example, the undesirable gases may include carbon oxides ($CO_x$) such as carbon dioxide ($CO_2$) and carbon monoxide (CO), nitrogen oxides ($NO_x$) such as nitrogen dioxide ($NO_2$), and/or sulfur oxides ($SO_x$) such as sulfur dioxide ($SO_2$). Accordingly, a need exists to reduce the space consumption for exhaust diffusion, thereby increasing the available space for gas treatment.

BRIEF DESCRIPTION

Certain embodiments commensurate in scope with the originally claimed subject matter are summarized below. These embodiments are not intended to limit the scope of the claimed embodiments, but rather these embodiments are intended only to provide a brief summary of possible forms of the subject matter. Indeed, the presently claimed embodiments may encompass a variety of forms that may be similar to or different from the embodiments set forth below.

A system includes an exhaust diffuser system having an axial-radial diffuser and a transition duct. The axial-radial diffuser includes an inlet, an outlet, an axial diffuser portion between the inlet and the outlet, and a radial diffuser portion between the axial diffuser portion and the outlet, wherein the inlet is configured to couple to a gas turbine system. The transition duct is coupled to the axial-radial diffuser, wherein the outlet is disposed inside of an intake portion of the transition duct, and the transition duct includes a discharge portion configured to couple to a heat recovery steam generator (HRSG).

A method includes diffusing an exhaust gas from a gas turbine system through an axial-radial diffuser of an exhaust diffuser system. The axial-radial diffuser includes an inlet, an outlet, an axial diffuser portion between the inlet and the outlet, and a radial diffuser portion between the axial diffuser portion and the outlet, wherein the inlet is coupled to the gas turbine system. The method also includes transitioning the exhaust gas from the radial diffuser portion to a heat recovery steam generator (HRSG) through a transition duct of the exhaust diffuser system. The transition duct is coupled to the axial-radial diffuser, the outlet is disposed inside of an intake portion of the transition duct, and the transition duct includes a discharge portion coupled to the HRSG.

A system includes an exhaust diffuser system configured to mount between a gas turbine system and a heat recovery steam generator (HRSG). The exhaust diffuser system includes a radial diffuser portion having a central hub with an inner wall disposed about a central axis, an outer wall disposed about the inner wall, and an exhaust passage between the inner and outer walls. The exhaust diffuser system includes a flow passage area adjustment system having a drive coupled to the central hub of the radial diffuser portion. The exhaust diffuser system also includes a controller coupled to the drive, wherein the controller is configured to control the drive to move the central hub of the radial diffuser portion to adjust a flow through the radial diffuser portion.

BRIEF DESCRIPTION OF THE DRAWINGS

These and other features, aspects, and advantages of the presently disclosed system and techniques will become better understood when the following detailed description is read with reference to the accompanying drawings in which like characters represent like parts throughout the drawings, wherein:

FIG. 8 is a schematic side view of an embodiment of the exhaust diffuser system of FIGS. 1-6, further illustrating details of the radial diffuser portion of the axial-radial diffuser having an S-curved profile.

DETAILED DESCRIPTION

Figure 1:
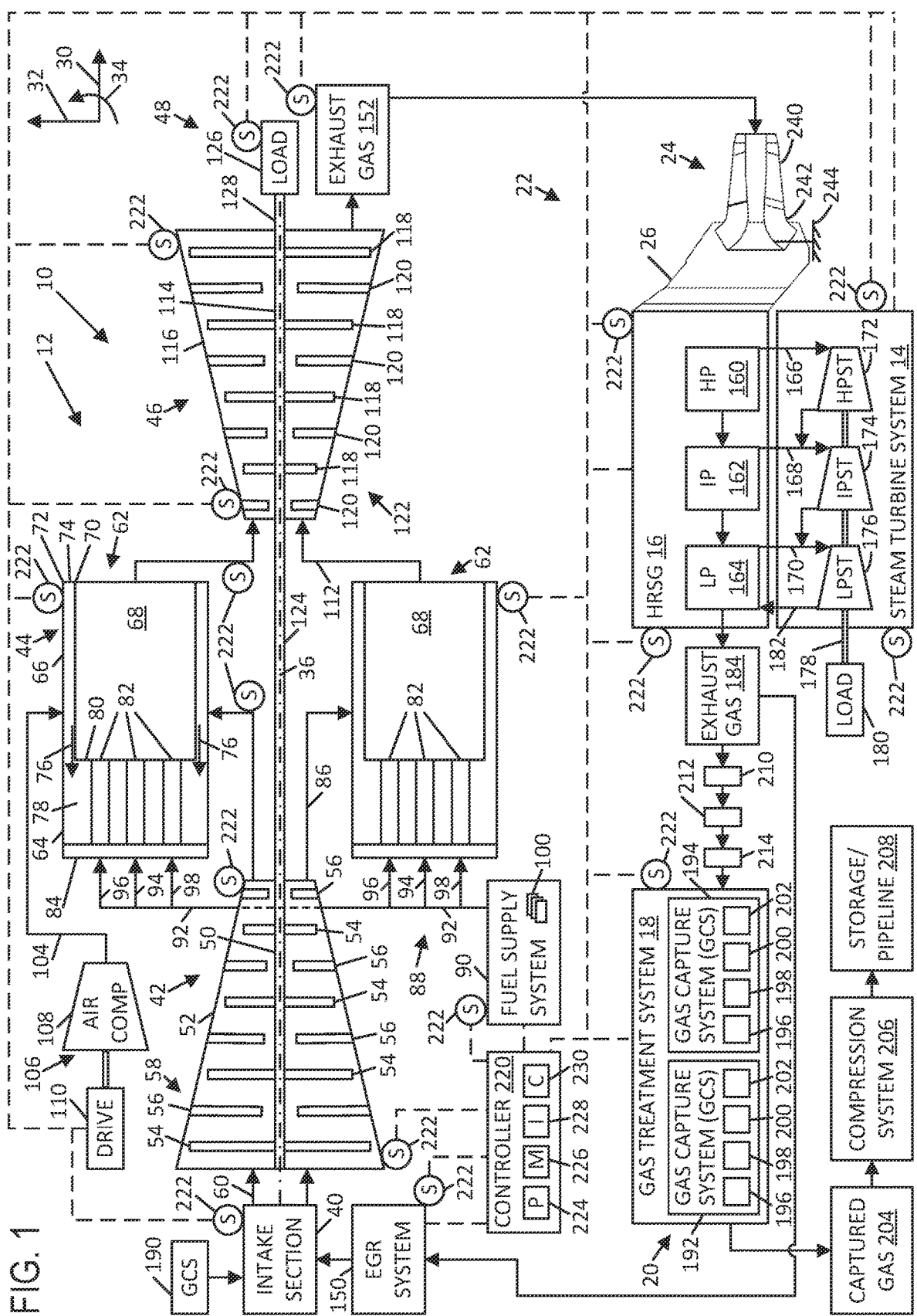
FIG. 1 is a block diagram of an embodiment of a combined cycle system having a gas turbine system, a steam turbine system, a heat recovery steam generator (HRSG), a gas treatment system having one or more gas capture systems, and an exhaust diffuser system.

One or more specific embodiments of the presently disclosed systems and methods are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the presently disclosed embodiments, the articles "a," "an," "the," and "said" are intended to mean that there are one or more of the elements. The terms "comprising," "including," and "having" are intended to be inclusive and mean that there may be additional elements other than the listed elements.

The disclosed embodiments include systems and methods to reduce the space consumption for exhaust diffusion via an axial-radial diffuser between a gas turbine system and a heat recovery steam generator (HRSG). The axial-radial diffuser is relatively shorter in length compared with an axial diffuser, and thus enables closer placement of the HRSG relative to the gas turbine system. The reduced space consumption of the axial-radial diffuser provides additional space for gas treatment systems. Additionally, the axial-radial diffuser may substantially improve the flow uniformity of the exhaust gas directed toward the tubes (e.g., tube bundles) of the HRSG, thereby helping to improve the efficiency of the HRSG.

Using the space savings achieved with the axial-radial diffuser, the disclosed embodiments may improve or expand a gas treatment system via one or more gas capture systems. The gas capture systems are configured to remove undesirable gases (e.g., $CO_2$) from the intake air and/or the exhaust gas of the combustion systems. The gas capture systems may include sorbent-based gas capture systems, solvent-based gas capture systems, cryogenic gas capture systems, or a combination thereof.

For example, the gas capture systems (e.g., sorbent-based gas capture systems) may include one or more temperature swing adsorption (TSA) units or adsorbers, which rely on temperature swings to adsorb undesirable gases at a first temperature (e.g., low temperature) and desorb the undesirable gases at a second temperature (e.g., high temperature). For example, the sorbent-based gas capture systems are configured to adsorb the undesirable gases into a sorbent material, and then subsequently desorb the undesirable gases from the sorbent material using a heat source (e.g., steam from the HRSG, steam from the steam turbine system, or other steam source). The adsorption process is exothermic, while the desorption process is endothermic.

By further example, the solvent-based gas capture systems may include an absorber configured to absorb the undesirable gas into a solvent, and a stripper configured to strip the undesirable gas from the solvent using steam (e.g., steam from the HRSG, steam from the steam turbine system, or other steam source). Although the solvent-based gas capture systems are discussed as using a solvent as an absorbent fluid, the disclosed embodiments may use any suitable absorbent fluid for capturing undesirable gases. Accordingly, the solvent-based gas capture system also may be described as a fluid absorbent-based gas capture system.

As discussed below, the axial-radial diffuser may be used to save space (e.g., reduce the footprint for exhaust diffusion), thereby providing additional space for the gas treatment systems (e.g., gas capture systems). Although specific examples are provided below, the gas capture systems, including but not limited to, sorbent-based gas capture systems, solvent-based gas capture systems, and cryogenic gas capture systems, may be added, expanded, and/or generally improved using the space savings achieved with the present axial-radial diffuser. However, the axial-radial diffuser also may provide space savings for other reasons.

FIG. 1 is a block diagram of an embodiment of a combined cycle system 10 having a gas turbine system 12, a steam turbine system 14, a heat recovery steam generator (HRSG) 16, a gas treatment system 18 having one or more gas capture systems 20, and an exhaust diffuser system 22. The gas capture systems 20 are configured to capture an undesirable gas (e.g., $CO_2$) from a gas, such as exhaust gas and/or air. As discussed below, the gas capture systems 20 may include sorbent-based gas capture systems, solvent-based gas capture systems, cryogenic gas capture systems, or any combination thereof. The exhaust diffuser system 22 includes an axial-radial diffuser 24 coupled to a transition duct 26, wherein the axial-radial diffuser 24 is coupled to the gas turbine system 12 and the transition duct 26 is coupled to the HRSG 16. The axial-radial diffuser 24 is configured to diffuse the exhaust gas 152 from the gas turbine system 12 via axial diffusion and radial diffusion, thereby reducing the axial length and footprint of the exhaust diffuser system 22 relative to an axial only diffuser. Additionally, the transition duct 26 is configured to transition the exhaust gas 152 from the axial-radial diffuser 24 to the HRSG 16 via flow conditioning to help provide a more uniform flow of the exhaust gas 152 into the HRSG 16.

Before discussing details of the gas treatment system 18 and the exhaust diffuser system 22, various aspects of the combined cycle system 10 are discussed in further detail. For purposes of orientation in the drawings, reference may be made to an axial direction or axis 30, a radial direction or axis 32 extending radially away from the axial direction or axis 30, and a circumferential direction or axis 34 extending circumferentially around the axial direction or axis 30. The directions or axes 30, 32, and 34 may be in reference to a rotational axis 36 of the gas turbine system 12, for example. Additionally, the directions or axes 30, 32, and 34 may be in reference to a central axis of the exhaust diffuser system 22 (e.g., axis 270 shown in FIG. 3).

The gas turbine system 12 may include an intake section 40, a compressor or compressor section 42, a combustor section 44, a gas (expansion) turbine or turbine section 46, and an exhaust section 48. The compressor section 42 may include at least one shaft 50 disposed along the rotational axis 36, a casing 52 (e.g., annular casing) disposed circumferentially about the at least one shaft 50, a plurality of rotating compressor blades 54 extending radially outward from the at least one shaft 50, and a plurality of stationary compressor vanes 56 extending radially inward from the casing 52 toward the at least one shaft 50. In the illustrated embodiment, the compressor section 42 may include a plurality of compressor stages 58, each having a plurality of the compressor vanes 56 spaced circumferentially about the at least one shaft 50 at an axial position and a plurality of the compressor blades 54 spaced circumferentially about the at least one shaft 50 at a different axial position immediately adjacent to the axial position of the compressor vanes 56 (i.e., the compressor vanes 56 and the compressor blades 58 are axially spaced apart). Accordingly, the compressor section 42 is configured to receive a flow of an intake gas 60 from the intake section 40 and to progressively compress the intake gas 60 through the plurality of compressor stages 58. As discussed in further detail below, the intake gas 60 may include an intake air, an exhaust gas recirculation (EGR) flow or recirculated exhaust gas, or a combination thereof.

The combustor section 44 may include one or more combustors 62, such as a single annular combustor disposed circumferentially about the rotational axis 36 or a plurality of combustors 62 circumferentially spaced about the rotational axis 36. In the illustrated embodiment, each combustor 62 includes a head end portion 64 coupled to a combustion portion 66. In an exemplary arrangement, the combustion portion 66 includes a combustion chamber 68, a combustor liner 70 disposed circumferentially about the combustion chamber 68, a flow sleeve 72 disposed circumferentially about the combustor liner 70, and a passage 74 extending between the combustor liner 70 and the flow sleeve 72. The passage 74 is configured to route a compressed gas flow in an upstream direction 76 toward a head end chamber 78 disposed in the head end portion 64. The head end chamber 78 and the combustion chamber 68 of the combustor 62 are separated or divided from one another by an intermediate plate 80. In the head end chamber 78, a plurality of fuel nozzles 82 are coupled to the intermediate plate 80 and an end plate 84 of the head end portion 64. In operation, each combustor 62 receives a compressed gas 86 (e.g., air, EGR, etc.) from the compressor section 42, routes the compressed gas 86 along the passage 74 toward the head end chamber 78 as indicated by arrow 76, and routes the compressed gas through the fuel nozzles 82 into the combustion chamber 68.

In certain embodiments, each combustor 62 may receive one or more fuel flows from a fuel system 88 coupled to the fuel nozzles 82, wherein the fuel system 88 includes a fuel supply system 90 coupled to one or more fuel circuits 92. For example, the fuel circuits 92 may include fuel circuits 94, 96, and 98 coupled to different sets of the fuel nozzles 82. The fuel circuits 92 (e.g., 94, 96, and 98) may include fuel conduits, fuel manifolds, fuel valves, pressure regulators, and other flow controls. The fuel system 88 is configured to supply one or more fuels, such as liquid and/or gas fuels, into each of the fuel nozzles 82 for injection into the combustion chamber 68. The fuels may include natural gas, syngas generated from a gasifier, methane, hydrogen, biofuel, fuel oils, or any combination thereof. The fuel supply system 90 may include a plurality of components to control flows of the various fluids to the combustor 62. For example, the fuel supply system 90 may include one or more components 100. In certain embodiments, the components 100 may include one or more fuel tanks, fuel pumps, valves, pressure regulators, flow regulators, filters, water removal units, particulate removal units, manifolds, flow controllers, or any combination thereof.

The fuel nozzles 82 are configured to inject one or more fuels from the fuel system 88 and the compressed gas 86 from the compressor section 42. In certain embodiments, the fuel nozzles 82 are configured to inject a compressed air 104 from a compressor system 106 having an air compressor 108 coupled to a drive 110, such as an electric motor, a combustion engine, a shaft coupled to the gas turbine system 12, or another suitable drive. The compressor system 106 may be configured to receive air from ambient and/or from the intake section 40. Additionally, the compressor system 106 may be configured to enable multiple modes of operation, such as EGR mode or non-EGR mode.

For example, in certain embodiments of the gas turbine system 12 having exhaust gas recirculation (EGR), the compressor section 42 supplies the compressed gas 86 (e.g., compressed exhaust gas) to each combustor 62, while the compressor system 106 supplies the compressed air 104 to each combustor 62. By further example, in certain embodiments of the gas turbine system 12 without exhaust gas recirculation (EGR), the compressor section 42 supplies the compressed gas 86 (e.g., compressed air) to each combustor 62 without any need for additional air supplies. Thus, the compressor system 106 may optionally supply the compressed air 104 to each combustor 62. In operation, the fuel may be combusted with the air in the combustion chamber 68 of each combustor 62, thereby generating a hot combustion gas 112 for delivery from the combustion chamber 68 into the turbine section 46.

The turbine section 46 includes at least one shaft 114 disposed along the rotational axis 36, a casing 116 (e.g., annular casing) disposed circumferentially about the at least one shaft 114, a plurality of rotating turbine blades 118 extending radially outward from the at least one shaft 114, and a plurality of stationary turbine vanes 120 extending radially inward from the casing 116 toward the at least one shaft 114. The turbine section 46 may include a plurality of turbine stages 122, each having a plurality of the turbine vanes 120 spaced circumferentially about the at least one shaft 114 at an axial position, and a plurality of the turbine blades 118 spaced circumferentially about the at least one shaft 114 at a different axial position immediately adjacent the axial position of the turbine blades 118 (i.e., the turbine vanes 120 and the turbine blades 118 are axially spaced apart). The at least one shaft 114 also may be coupled to the at least one shaft 50 of the compressor section 42 via at least one intermediate shaft 124.

Additionally, the at least one shaft 114 may be coupled to a load 126 via a shaft 128. In certain embodiments, the load 126 may include an electrical generator, a machine, a propulsion system for a vehicle, or any other suitable load. In the illustrated embodiment, the load 126 may be an electrical generator, such that the combined cycle system 10 is a combined cycle power plant. In operation, the combustion gas 112 flows from the combustor 62 into the turbine section 46, wherein the combustion gas 112 progressively expands and drives rotation of the turbine blades 118 coupled to the at least one shaft 114 in each of the turbine stages 122. Thus, the combustion gas 112 drives the turbine section 46, which in turn drives the compressor section 42 and the load 126 via the interconnected shafts 50, 124, 114, and 128.

In certain embodiments, the gas turbine system 12 may be configured with a common rotational direction of the shafts 50, 114, 124, and 128 and the connected compressor blades 54 and turbine blades 118. The shafts 50, 114, 124, and 128 may be removably coupled together with shaft connections, such as flanged joints. In some embodiments, some of the shafts may be combined to reduce the number of shafts. For example, all of the illustrated shafts 50, 114 and 124 may represent a common shaft rotating in the common rotational direction, such as a clockwise or counter-clockwise rotational direction.

The gas turbine system 12 can be configured with or without the compressor system 106 and an exhaust gas recirculation (EGR) system 150. The EGR system 150 is configured to recirculate an exhaust gas 152 output by the turbine section 46 back into the compressor section 42 (e.g., via intake section 40) for compression and delivery to the combustor section 44. However, the gas turbine system 12 may exclude the EGR system 150 and intake only an airflow into the intake section 40 for compression by the compressor section 42.

In certain embodiments of the gas turbine system 12 having the EGR system 150, the recirculated exhaust gas 152 flows through the intake section 40 and each of the compressor stages 58 of the compressor section 42, thereby compressing the recirculated exhaust gas as the compressed gas 86 for delivery into combustor section 44. Additionally, the combustor section 44 may receive compressed air 104 from the air compressor 108 of the compressor system 106 through the fuel nozzles 82. The combustor section 44 also receives the fuel from the fuel system 88, such as through the fuel nozzles 82. The fuel from the fuel system 88 then combusts with the air from the compressor system 106 to generate the combustion gases 112, which then flow through the turbine section 46 to drive rotation of the turbine blades 118 in each of the turbine stages 122. The recirculated exhaust gas helps to reduce the temperature and formation of certain emissions (e.g., nitrogen oxides ($NO_X$)) associated with combustion in the combustor section 44.

In certain embodiments of the gas turbine system 12 without the EGR system 150, the compressor section 42 receives an airflow from the intake section 40, progressively compresses the airflow via the compressor stages 58, and delivers the compressed airflow as the compressed gas 86 into the combustor section 44. The compressed airflow then facilitates combustion of the fuel from the fuel system 88, thereby generating the hot combustion gases 112 for delivery to the turbine section 46. In such embodiments, the compressor system 106 may be excluded or included to provide additional compressed air 104 to the combustor section 44. Regardless of the configuration, the combustion gas 112 drives rotation of the turbine blades 118 in the turbine stages 122, thereby rotating the at least one shaft 114 coupled to the at least one shaft 50 of the compressor section 42 and the shaft 128 driving the load 126.

The exhaust gas 152 output by the turbine section 46 may then pass through the exhaust diffuser system 22 and into the HRSG 16 for transfer of heat from the exhaust gas into water to generate steam for the steam turbine system 14. Various aspects of the exhaust diffuser system 22 are discussed in detail below. In the illustrated embodiment, the HRSG 16 may include a high-pressure section 160, an intermediate-pressure section 162, and a low-pressure section 164 in a series arrangement, thereby generating a high-pressure steam 166, an intermediate-pressure steam 168 and a low-pressure steam 170. The HRSG 16 may include a plurality of components, such as economizers, evaporators, super-heaters, or any combination thereof, in each of the sections 160, 162, and 164. The components of the HRSG 16 also may form tube bundles, such as heat exchanger tube bundles, for each of the sections 160, 162, and 164. The components of the HRSG 16 may be coupled together via various conduits and headers. In certain embodiments, the components of the HRSG 16 include a finishing high-pressure superheater, a secondary re-heater, a primary re-heater, a primary high-pressure superheater, an inter-stage attemperator, a high-pressure evaporator, a high-pressure economizer, an intermediate-pressure evaporator, an intermediate-pressure economizer, a low-pressure evaporator, and a low-pressure economizer.

The heat recovery steam generator 16 may route the high-pressure steam 166 to a high-pressure steam turbine 172, the intermediate-pressure steam 168 to an intermediate-pressure steam turbine 174, and the low-pressure steam 170 to a low-pressure steam turbine 176 of the steam turbine system 14. The steam drives rotation of blades within each of the steam turbines 172, 174, 176, thereby driving a shaft 178 coupled to a load 180, such as an electric generator. The low-pressure steam turbine 176 also may return a condensate 182 back to the low-pressure section 164 of the HRSG 16. The HRSG 16 may then output the exhaust gas 152 as a partially cooled exhaust gas 184, which may then pass through the gas treatment system 18.

As discussed above, the gas treatment system 18 includes one or more gas capture systems 20. For example, the gas capture systems 20 may include any one or any combination of gas capture systems 190, 192, and 194, each having a plurality of components (e.g., components 196, 198, 200, and 202). The gas capture systems 20 (e.g., 190, 192, and 194) are configured to obtain a captured gas 204 from the intake gas 60 and/or the exhaust gas 152, 184. In the illustrated embodiment, the gas capture systems 20 (e.g., 190, 192, and 194) may capture and output carbon dioxide ($CO_2$) as the captured gas 204, which may further be directed to a compression system 206. For example, the compression system 206 may include one or more compressors configured to compress the captured gas 204 (e.g., $CO_2$) and deliver the captured gas to storage and/or a pipeline 208.

The gas capture system 190 is disposed at, in, or upstream of the intake section 40 for capturing undesirable gases from the intake air. Accordingly, the gas capture system 190 may be described as a direct air capture (DAC) system. The gas capture systems 192 and 194 are disposed downstream of the gas turbine system 12 and/or the HRSG 16 for capturing undesirable gases from the exhaust gas 152, 184. The gas capture systems 20 (e.g., 190, 192, and 194) may include sorbent-based gas capture systems, solvent-based gas capture systems, cryogenic gas capture systems, or any combination thereof, configured to remove and capture undesirable gases.

In certain embodiments, the gas capture systems 20 (e.g., 190, 192, and 194) may be configured to remove and capture undesirable gases, such as carbon oxides ($CO_X$) (e.g., carbon dioxide ($CO_2$) and carbon monoxide (CO)), and thus the gas capture systems 20 may be described as carbon capture systems. In certain embodiments, the gas capture systems 20 (e.g., 190, 192, and 194) may be configured to remove and capture undesirable gases, such as nitrogen oxides ($NO_X$) (e.g., nitrogen dioxide ($NO_2$)), and thus the gas capture systems 20 may be described as $NO_X$ capture systems. In certain embodiments, the gas capture systems 20 (e.g., 190, 192, and 194) may be configured to remove and capture undesirable gases, such as sulfur oxides ($SO_X$) (e.g., sulfur dioxide ($SO_2$)), and thus the gas capture systems 20 may be described as $SO_X$ capture systems. In the following discussion, the gas capture systems 20 (e.g., 190, 192, and 194) may be described as sorbent-based carbon capture systems using sorbent materials as an example and/or solvent-based carbon capture systems using liquid absorbents (e.g., solvents) as an example. However, the embodiments disclosed herein may use any type or configuration of gas capture systems 20 (e.g., 190, 192, and 194) as noted above.

Each of the gas capture systems 20 (e.g., 190, 192, and 194) may include components 196, 198, 200, and 202 suitable to support the type and configuration of the gas capture systems 20, such as components supporting sorbent-based gas capture systems, solvent-based gas capture systems, cryogenic gas capture systems, or any combination thereof. For example, the components 196, 198, 200, and 202 may include adsorbers having sorbent materials, solvent-based absorbers and strippers, heat exchangers, cryogenic systems, or any combination thereof. Additionally, one or more components 210, 212, and 214 may be disposed upstream from the gas capture systems 192 and 194, such as a dryer or water removal system (e.g., water gas separator), a particulate removal system (e.g., filter and/or solid gas separator), one or more booster fans, one or more coolers (e.g., a direct contact cooler (DCC)), or any combination thereof.

In certain embodiments, the exhaust gas 184 may partially or entirely bypass the gas treatment system 18 and flow to the EGR system 150, and/or the exhaust gas 184 may partially or entirely flow through the gas treatment system 18 before flowing to the EGR system 150. The EGR system 150 may include one or more conduits, valves, flow controls, coolers, blowers, or any combination thereof, configured to provide at least a portion of the exhaust gas 152, 184 (e.g., EGR flow) to the intake section 40 for recirculation through the compressor section 42. The cooler may be configured to cool the exhaust gas 152, 184 to a lower temperature (e.g., approximately ambient temperature) prior to recirculation into the compressor section 42. The blower may be configured to increase a pressure and flow of the exhaust gas 152, 184 to help overcome pressure losses in the EGR system 150.

In the illustrated embodiment, the combined cycle system 10 also includes a controller 220 coupled to the gas turbine system 12, the steam turbine system 14, the HRSG 16, the gas treatment system 18, the fuel system 88, the EGR system 150, the compression system 106, and various sensors 222 distributed throughout the combined cycle system 10. In the illustrated embodiment, the controller 220 includes one or more processors 224, memory 226, instructions 228 stored on the memory 226 and executable by the processor 224, and communication circuitry 230 configured to communicate with the sensors 222 and various equipment throughout the combined cycle system 10. For example, the controller 220 is configured to control the fuel delivery and distribution from the fuel system 88 to the fuel nozzles 82 in the combustor section 44. In certain embodiments, the controller 220 is configured to control operation of the gas capture systems 20 (e.g., 190, 192, and 194), such by controlling modes of operation (e.g., adsorption mode and desorption mode), controlling flows of various fluids through the gas capture systems 20, or any combination thereof.

The sensors 222 (designated with an "S") are configured to monitor various operational parameters of the combined cycle system 10. In certain embodiments, the sensors 222 include temperature sensors, pressure sensors, flow rate sensors, fluid composition sensors (e.g., gas composition sensors), vibration sensors, clearance sensors, speed sensors, humidity and/or moisture sensors, or any combination thereof. The sensors 222 may monitor the parameters (e.g., temperature, pressure, flow rate, and fluid composition) at one or more locations of the compressor section 42, the combustor section 44, the turbine section 46, the gas treatment system 18, or any combination thereof.

For example, the sensors 222 may monitor compressor parameters (e.g., pressure ratio between the inlet and outlet of the compressor section 42), combustion gas parameters (e.g., firing temperature and combustion dynamics), turbine parameters (e.g., temperature and pressure at each turbine stage, the turbine inlet, and the turbine exhaust), and exhaust gas emissions. By further example, the exhaust gas emissions monitored by the sensors 222 may include carbon oxides ($CO_X$) such as carbon dioxide ($CO_2$) and carbon monoxide (CO), nitrogen oxides ($NO_X$) such as nitrogen dioxide ($NO_2$), sulfur oxides ($SO_X$) such as sulfur dioxide ($SO_2$), unburnt hydrocarbons, particulate matter, and other undesirable exhaust emissions. By further example, the sensors 222 may monitor the temperature of the sorbent materials in sorbent-based gas capture systems, the temperature of solvent in solvent-based gas capture systems, or any combination thereof. In response to the feedback from the sensors 222, the controller 220 may adjust the operating mode, fluid flows, heating, cooling, or any combination thereof, in the gas capture systems 20.

As discussed above, the combined cycle system 10 includes the exhaust diffuser system 22 disposed between the gas turbine system 12 and the HRSG 16. Although the axial-radial diffuser 24 is shown schematically separate from the gas turbine system 12, the axial-radial diffuser 24 may be mounted to the gas turbine system 12 at the turbine section 46. For example, the axial-radial diffuser 24 may be directly or indirectly mounted to an aft frame of the gas turbine system 12 coaxial with a rotational axis of the turbine section 46. The axial-radial diffuser 24 includes an axial diffuser portion 240 coupled to a radial diffuser portion 242. The axial-radial diffuser 24 also extends partially into the transition duct 26. For example, the radial diffuser portion 242 and, in some embodiments part of the axial diffuser portion 240, extend into the transition duct 26. The axial-radial diffuser 24 also may be supported by a support structure 244.

In some embodiments, the radial diffuser portion 242 has a flow passage area adjustment system configured to adjust (e.g., increase or decrease) a flow through the radial diffuser portion 242 into the transition duct 26, one or more perforated walls configured to bypass a portion of the exhaust gas 152 through a central area of the radial diffuser portion 242, or a combination thereof. Additionally, in some embodiments, the radial diffuser portion 242 may be symmetric or asymmetric about a central axis of the axial-radial diffuser 24. For example, the radial diffuser portion 242 may be asymmetric to help control a distribution of the exhaust gas 152 into and through the transition duct 26, thereby helping to provide a more uniform flow of the exhaust gas 152 to the tube bundles in the HRSG 16. Additionally, the transition duct 26 may include various flow conditioning features to condition the exhaust gas 152 before entry into the HRSG 16. Various aspects and embodiments of the exhaust diffuser system 22 are discussed in further detail below.

Figure 2:
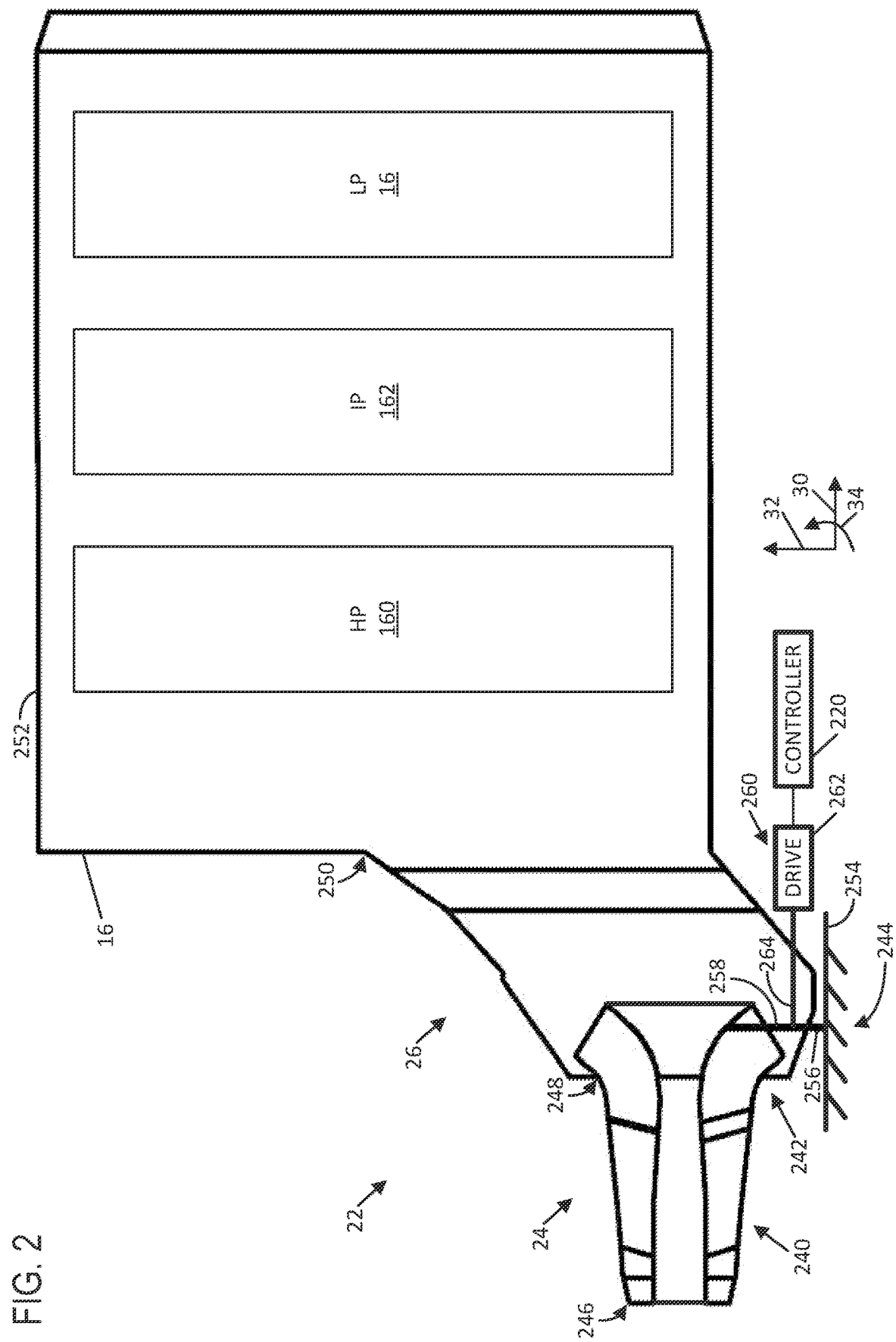
FIG. 2 is a schematic side view of an embodiment of the exhaust diffuser system coupled to the HRSG of FIG. 1.

FIG. 2 is a schematic side view of an embodiment of the exhaust diffuser system 22 coupled to the HRSG 16 of FIG. 1. As illustrated, the axial-radial diffuser 24 includes the axial diffuser portion 240 coupled to the radial diffuser portion 242, wherein the axial-radial diffuser 24 extends partially into the transition duct 26. The axial diffuser portion 240 includes a turbine coupling or mount 246 configured to couple the axial-radial diffuser 24 to the turbine section 46 of the gas turbine system 12. For example, the turbine mount 246 may include a removable mount (e.g., overlapping walls or flanges bolted together) between the axial diffuser portion 240 and the turbine section 46. The radial diffuser portion 242 includes a duct coupling or mount 248 configured to couple the axial-radial diffuser 24 to the transition duct 26. For example, the duct mount 248 may include a fixed mount (e.g., welded connector) or removable mount (e.g., overlapping walls or flanges bolted together) between the radial diffuser portion 242 and the transition duct 26. The transition duct 26 may include a duct coupling or mount 250 configured to couple the transition duct 26 to a duct 252 of the HRSG 16. For example, the duct mount 250 may include a fixed mount (e.g., welded connector) or a removable mount (e.g., overlapping walls or flanges bolted together) between the transition duct 26 and the duct 252 of the HRSG 16. In the illustrated embodiment, the duct 252 of the HRSG 16 houses the high-pressure section 160, the intermediate-pressure section 162, and the low-pressure section 164, which may include various tube bundles and components as discussed above.

The exhaust diffuser system 22 is supported at the mounts 246, 248, and 250 and the support structure 244. The mounts 246, 248, and 250 also provide sealed connections to provide a sealed flow path of the exhaust gas 152 from the turbine section 46 to the HRSG 16, while the axial-radial diffuser 24 diffuses the exhaust gas 152 and the transition duct 26 conditions and distributes the exhaust gas 152 more uniformly into the duct 252 of the HRSG 16. The support structure 244 is coupled to the axial-radial diffuser 24 and a surrounding structure and/or a base 254. For example, the support structure 244 may be coupled to the axial diffuser portion 240, the radial diffuser portion 242, or a combination thereof, via a framework 256 having a plurality of supports 258. In the illustrated embodiment, the framework 256 has one or more supports 258 coupled to the radial diffuser portion 242. The supports 258 may include struts, rods, arms, legs, or any combination thereof. The supports 258 may extend outwardly and/or downwardly to the base 254, and thus may be described as legs. In certain embodiments, the supports 258 may include vertical supports, horizontal supports, acutely angled supports, or any combination thereof. The base 254 may include a ground base, such as a concrete support pad along the ground. The supports 258 may include fixed supports and/or adjustable supports configured to adjust the support and/or positioning of the axial-radial diffuser 24, such as the axial diffuser portion 240 and/or the radial diffuser portion 242.

In the illustrated embodiment, the exhaust diffuser system 22 includes a flow passage area adjustment system 260 having an actuator or drive 262 coupled to a transmission 264, which is configured to move a portion of the radial diffuser portion 242 to adjust a flow area of the exhaust gas 152 and thus a distribution of the exhaust gas 152. In the illustrated embodiment, the transmission 264 is coupled to the support 258 of the support structure 244. However, the transmission 264 may be directly and/or indirectly coupled to the radial diffuser portion 242. The drive 262 may include an electric drive (e.g., electric motor), a fluid drive (e.g., hydraulic and/or pneumatic drive), a manual drive, or any combination thereof. The drive 262 also may be coupled to the controller 220, which may be configured to adjust the drive 262 to change (e.g., increase or decrease) a flow of the exhaust gas 152 through the radial diffuser portion 242. The flow passage area adjustment system 260 is discussed in further detail below.

Figure 3:
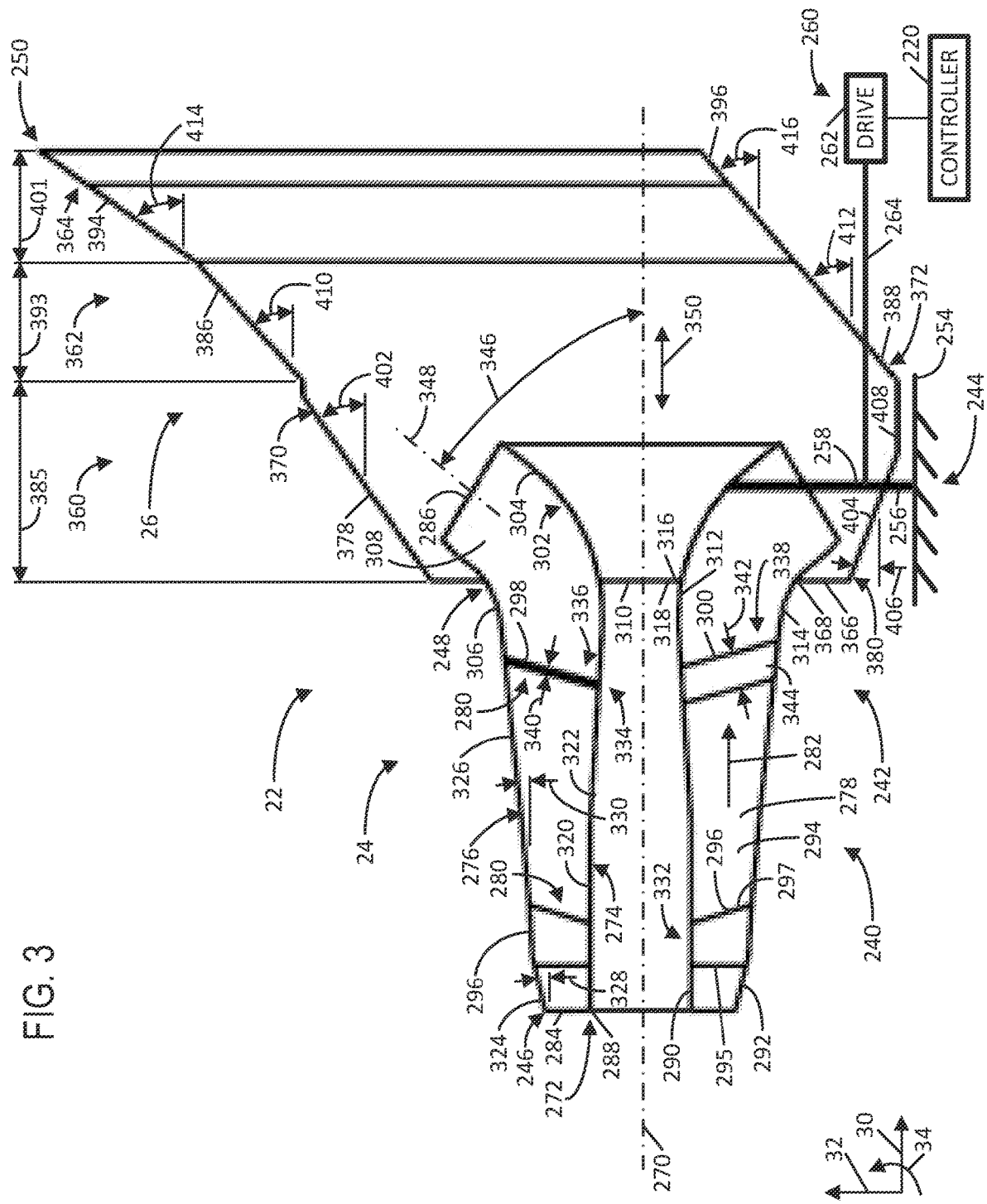
FIG. 3 is a schematic side view of an embodiment of the exhaust diffuser system of FIGS. 1 and 2, further illustrating details of an axial-radial diffuser and a transition duct of the exhaust diffuser system.

FIG. 3 is a schematic side view of an embodiment of the exhaust diffuser system 22 of FIGS. 1 and 2, further illustrating details of the axial-radial diffuser 24 and the transition duct 26 of the exhaust diffuser system 22. The exhaust diffuser system 22 is the same as described above with reference to FIGS. 1 and 2, and thus like element numbers are used in FIG. 3. The axial-radial diffuser 24 extends axially along a central axis 270, which may be axially aligned with the rotational axis 36 of the gas turbine system 12. For example, the axial-radial diffuser 24 may be coaxial or concentric with the central axis 270. In certain embodiments, the axial-radial diffuser 24 may be completely symmetric about the central axis 270, completely asymmetric about the central axis 270, or a combination of symmetric and asymmetric about the central axis 270. For example, in some embodiments, the axial diffuser portion 240 is symmetric about the central axis 270, while the radial diffuser portion 242 is asymmetric about the central axis 270.

As illustrated in FIG. 3, the axial-radial diffuser 24 includes a central hub 272 having an inner wall 274 disposed circumferentially about the central axis 270, an outer wall 276 disposed circumferentially about the central axis 270 and the inner wall 274, a flow passage 278 disposed between the inner and outer walls 274 and 276, and a plurality of radial supports 280 extending between the inner and outer walls 274 and 276. In certain embodiments, the inner and outer walls 274 and 276 are annular walls that gradually change in diameter in a flow direction 282 of the exhaust gas 152 through the flow passage 278 of the axial-radial diffuser 24 from an inlet 284 to an outlet 286. The flow passage 278 may be an annular flow passage that gradually increases in a cross-sectional area (e.g., a cross-sectional area perpendicular to the central axis 270) in the flow direction 282 from the inlet 284 to the outlet 286. Additionally, the flow passage 278 may be substantially straight or axially oriented along the central axis 270 in the axial diffuser portion 240, whereas the flow passage 278 may turn radially outward away from the central axis 270 in the radial diffuser portion 242. The inlet 284 may be an annular inlet or opening formed between the inner and outer walls 274 and 276. For example, the inlet 284 may be aligned with and fluidly coupled to an annular outlet of the turbine section 46 of the gas turbine system 12. Similarly, the outlet 286 may be an annular outlet or opening formed between the inner and outer walls 274 and 276. However, the outlet 286 may be oriented radially outward from the central axis 270 into the transition duct 26.

The radial supports 280 may include cylindrical or annular supports, airfoil shaped supports, or any combination thereof. Additionally, the radial supports 280 may include solid supports (i.e., non-hollow supports), hollow supports, or any combination thereof. The radial supports 280 may be disposed at different circumferential positions about the central axis 270 between the inner and outer walls 274 and 276, different axial positions along the central axis 270, or any combination thereof. Additionally, the radial supports 280 may be spaced uniformly or non-uniformly at the different circumferential positions about the central axis 270. Collectively, the central hub 272, the inner wall 274, the outer wall 276, the flow passage 278, and the radial supports 280 define both the axial diffuser portion 240 and the radial diffuser portion 242 of the axial-radial diffuser 24.

In the illustrated embodiment, each of the axial and radial diffuser portions 240 and 242 includes portions of the central hub 272, the inner wall 274, the outer wall 276, the flow passage 278, and the radial supports 280. For example, the axial diffuser portion 240 includes a central hub 288 (e.g., central hub portion of central hub 272) having an inner wall 290 (e.g., inner wall portion of inner wall 274) disposed circumferentially about the central axis 270, an outer wall 292 (e.g., outer wall portion of outer wall 276) disposed circumferentially about the central axis 270 and the inner wall 290, a flow passage 294 (e.g., flow passage portion of flow passage 278) disposed between the inner and outer walls 290 and 292, and a plurality of radial supports 296, 298, and 300 (e.g., each a portion of radial supports 280) extending between the inner and outer walls 290 and 292.

By further example, the radial diffuser portion 242 includes a central hub 302 (e.g., central hub portion of central hub 272) having an inner wall 304 (e.g., inner wall portion of inner wall 274) disposed circumferentially about the central axis 270, an outer wall 306 (e.g., outer wall portion of outer wall 276) disposed circumferentially about the central axis 270 and the inner wall 304, and a flow passage 308 (e.g., flow passage portion of flow passage 278) disposed between the inner and outer walls 304 and 306. In the illustrated embodiment, the radial diffuser portion 242 excludes radial supports 280 extending between the inner and outer walls 304 and 306. However, in some embodiments, the radial diffuser portion 242 includes one or more radial supports 280 extending between the inner and outer walls 304 and 306.

In certain embodiments, the axial and radial diffuser portions 240 and 242 are integrally formed as a single continuous structure, fixedly coupled together, or removably coupled together. For example, the central hubs 288 and 302 of the central hub 272 may be disposed adjacent one another at a central hub interface 310, the inner walls 290 and 304 of the inner wall 274 may be disposed adjacent one another at an inner wall interface 312, and the outer walls 292 and 306 of the outer wall 276 may be disposed adjacent one another at an outer wall interface 314. In certain embodiments, the central hub interface 310 has a central flange or plate 316 of the central hub 288 axially facing a central flange or plate 318 of the central hub 302. The central plates 316 and 318 may be fixedly coupled together (e.g., welded joint) and/or removably coupled together (e.g., threaded fasteners).

The inner wall interface 312 has the inner walls 290 and 304 coupled together circumferentially about the central axis 270 (e.g., annular coupling). In certain embodiments, the inner walls 290 and 304 may be integrally formed as one continuous piece as the inner wall 274. However, in some embodiments, the inner walls 290 and 304 may be fixedly coupled together (e.g., welded joint) and/or removably coupled together (e.g., threaded fasteners, support by support structure 244 and flow passage area adjustment system 260, etc.), wherein the inner walls 290 and 304 may be directly abutting, axially overlapping, and/or supported by flanged joints at the inner wall interface 312.

The outer wall interface 314 has the outer walls 292 and 306 coupled together circumferentially about the central axis 270 (e.g., annular coupling). In certain embodiments, the outer walls 292 and 306 may be integrally formed as one continuous piece as the outer wall 276. However, in some embodiments, the outer walls 292 and 306 may be fixedly coupled together (e.g., welded joint) and/or removably coupled together (e.g., threaded fasteners), wherein the outer walls 292 and 306 may be directly abutting, axially overlapping, and/or supported by flanged joints at the outer wall interface 314.

In the axial diffuser portion 240, the inner and outer walls 290 and 292 (e.g., annular walls) generally diverge relative to one another in the flow direction 282 from the inlet 284 toward the radial diffuser portion 242. The divergence of the inner and outer walls 290 and 292 causes a gradual increase in the cross-sectional area of the flow passage 294 in the flow direction 282, thereby helping to expand and diffuse the flow of the exhaust gas 152 in the axial direction 30. In the illustrated embodiment, the inner wall 290 (e.g., annular wall) includes an inner wall 320 followed by an inner wall 322 in the flow direction 282, wherein the inner wall 320 is a constant diameter or cylindrical wall, and the inner wall 322 is a variable diameter or tapered annular wall. For example, the inner wall 322 may include a frustoconical wall, a curved annular wall (e.g., variable diameter along a curved profile in the flow direction 282), or a combination thereof. By further example, the inner wall 322 gradually decreases in diameter in the flow direction 282 (e.g., converges toward the central axis 270), thereby helping to increase the cross-sectional area of the flow passage 278.

Additionally, in the axial diffuser portion 240, the outer wall 292 (e.g., annular wall) includes an outer wall 324 followed by an outer wall 326 in the flow direction 282, wherein each of the outer walls 324 and 326 is a variable diameter or tapered annular wall. For example, each of the outer walls 324 and 326 may include a frustoconical wall, a curved annular wall (e.g., variable diameter along a curved profile in the flow direction 282), or a combination thereof. The outer walls 324 and 326 also may be angled differently relative to the central axis 270. For example, a first angle 328 between the outer wall 324 and the central axis 270 may be greater than a second angle 330 between the outer wall 326 and the central axis 270. In the illustrated embodiment, the outer wall 324 extends along the inner wall 320, while the outer wall 326 extends along both the inner wall 320 and the inner wall 322. Collectively, the inner and outer walls 290 and 292 define the gradually increasing cross-sectional area of the flow passage 278 (e.g., expanding annular flow passage) through the axial diffuser portion 240. In the illustrated embodiment, the inner and outer walls 290 and 292 are symmetric (e.g., concentric) about the central axis 270.

Furthermore, in the axial diffuser portion 240, the radial supports 280 may include a variety of configurations. In certain embodiments, the radial supports 296 include a plurality of airfoil shaped supports extending between the inner and outer walls 290 and 292 at a first axial position 332 along the central axis 270, wherein the radial supports 296 may be solid and/or hollow, and the radial supports 296 may be uniformly or non-uniformly spaced circumferentially about the central axis 270. In certain embodiments, a cross-sectional area of the radial supports 296 may increase in the radial direction 32 from the inner wall 290 to the outer wall 292. Additionally, in certain embodiments, an upstream or leading edge 295 may diverge from a downstream or trailing edge 297 of each radial support 296 in the radial direction 32 from the inner wall 290 to the outer wall 292. For example, the leading edge 295 may be perpendicular to the central axis 270, whereas the trailing edge 297 may be angled at an acute angle (e.g., 60 to 80 degrees) in a downstream direction from the inner wall 290 to the outer wall 292.

The radial supports 298 and 300 may be disposed at a second axial position 334 along the central axis 270 (e.g., downstream from first axial position), wherein the radial supports 298 and 300 are disposed at different circumferential positions about the central axis 270. For example, the radial supports 298 may be disposed vertically above the radial supports 300 in an upper portion 336 of the flow passage 278, while the radial supports 300 may be disposed vertically below the radial supports 298 in a lower portion 338 of the flow passage 278. However, any circumferential spacing may be used for the radial supports 298 and 300. In the illustrated embodiment, the radial supports 298 may be sized smaller and/or constructed differently than the radial supports 300. For example, a width, diameter, or cross-sectional area 340 of the radial supports 298 may be less than 10, 20, 30, 40, or 50 percent of a corresponding width, diameter, or cross-sectional area 342 of the radial supports 300.

By further example, the radial supports 298 may be solid supports (i.e., solid interior, non-hollow, without manway), whereas the radial supports 300 may be hollow supports (i.e., hollow interior 344 with manway). The radial supports 300 (e.g., hollow interior 344) may also serve as manway supports, which enable user access through the hollow interior 344 (e.g., through passage) for inspections, maintenance, and repairs. In certain embodiments, a cross-sectional area of the radial supports 298 and 300 may be constant or variable (e.g., increasing or decreasing) in the radial direction 32 from the inner wall 290 to the outer wall 292. Additionally, in certain embodiments, the radial supports 298 and 300 may be perpendicular and/or acutely angled (e.g., 60 to 80 degrees) relative to the central axis 270. However, in the illustrated embodiment, the radial supports 298 and 300 have a constant cross-sectional area and an acute angle, which is oriented in a downstream direction from the inner wall 290 to the outer wall 292.

In the radial diffuser portion 242, the inner and outer walls 304 and 306 (e.g., annular walls) generally diverge relative to one another in the flow direction 282 from the axial diffuser portion 240 toward the outlet 286, while the inner and outer walls 304 and 306 also gradually turn from the axial direction 30 toward the radial direction 32. The divergence of the inner and outer walls 304 and 306 causes a gradual increase in the cross-sectional area of the flow passage 308 in the flow direction 282, thereby helping to expand and diffuse the flow of the exhaust gas 152. In the illustrated embodiment, the inner wall 304 is a variable diameter or tapered inner annular wall, and the outer wall 306 is a variable diameter or tapered outer annular wall. In certain embodiments, each of the inner and outer walls 304 and 306 may include a frustoconical wall, a curved annular wall (e.g., variable diameter along a curved profile in the flow direction 282), or a combination thereof.

For example, the inner wall 304 may include a first radius of curvature defining a curved inner annular wall, while the outer wall 306 may include a second radius of curvature defining a curved outer annular wall. The first and second radii may be different from one another to define the expanding cross-sectional area of the flow passage 308. For example, the first radius may be greater than the second radius. Additionally, the first and second radii of curvature may be constant or variable in the flow direction 282, and the first and second radii of curvature may be constant or variable in the circumferential direction about the central axis 270.

In the illustrated embodiment, each of the inner and outer walls 304 and 306 continuously turns or curves from the axial diffuser portion 240 to the outlet 286, thereby gradually turning the flow of the exhaust gas 152 from the axial direction 30 toward the radial direction 32 to facilitate the radial diffusion of the exhaust gas 152 into the transition duct 26. The illustrated inner and outer walls 304 and 306 turn until the radial diffuser portion 242 reaches the outlet 286 oriented at an angle 346 between the central axis 270 and an axis 348 between the inner and outer walls 304 and 306. In certain embodiments, the angle 346 may be at least equal to or greater than 30, 40, 50, 60, 70, or 80 degrees, such as a range of 30 to 90, 40 to 70, or 50 to 60 degrees.

The radial diffuser portion 242 may include a fixed geometry or a variable geometry. For example, the radial diffuser portion 242 may include a variable geometry and flow area achieved via the flow passage area adjustment system 260. As discussed above, the flow passage area adjustment system 260 includes the drive 262 coupled to the transmission 264, wherein the transmission 264 is directly or indirectly coupled to the central hub 302 of the radial diffuser portion 242. For example, the transmission 264 may be indirectly coupled to the central hub 302 via the support structure 244. Regardless of the particular connection, the transmission 264 is driven by the drive 262 to move the central hub 302 of the radial diffuser portion 242 along the central axis 270 in the axial direction 30 as indicated by arrow 350.

In operation, in response to control by the controller 220, the flow passage area adjustment system 260 is configured to move the central hub 302 (including the inner wall 304) in the axial direction 30 away from the axial diffuser portion 240 (i.e., downstream relative to flow direction 282) to increase a separation distance and cross-sectional area between the inner and outer walls 304 and 306, thereby increasing a flow area of the exhaust gas 152 through the radial diffuser portion 242. In addition, in response to control by the controller 220, the flow passage area adjustment system 260 is configured to move the central hub 302 (including the inner wall 304) in the axial direction 30 toward the axial diffuser portion 240 (i.e., upstream relative to flow direction 282) to decrease a separation distance and cross-sectional area between the inner and outer walls 304 and 306, thereby decreasing a flow area of the exhaust gas 152 through the radial diffuser portion 242. For example, the flow passage area adjustment system 260 may be configured to adjust the flow area through the radial diffuser portion 242 to help vary the exhaust distribution into the transition duct 26 and to help vary the diffusion and/or flow conditioning through the transition duct 26.

The transition duct 26 includes a plurality of expansion stages 360, 362, and 364, each expanding in cross-sectional area and transitioning the flow of the exhaust gas 152 from the axial-radial diffuser 24 to the duct 252 of the HRSG 16. For example, the expansion stages 360, 362, and 364 may have different rates of expansion of the cross-sectional area. In certain embodiments, the transition duct 26 is a rectangular duct having a rectangular cross-sectional area that gradually increases through the expansion stages 360, 362, and 364. In certain embodiments, the expansion stage 360 may be described as an intake portion (e.g., diffuser output receiving portion), the expansion stage 364 may be described as a discharge portion (e.g., transition duct output portion or HRSG connecting portion), and the expansion stage 362 may be described as an intermediate duct portion between the intake and discharge portions.

As illustrated, the transition duct 26 includes an upstream or front wall 366 having an opening 368 (e.g., annular opening), wherein the axial-radial diffuser 24 extends through the opening 368 into the transition duct 26, and the outer wall 276 of the axial-radial diffuser 24 (e.g., outer wall 306 of the radial diffuser portion 242) is coupled to the front wall 366 at the duct mount 248. The transition duct 26 includes a top wall 370, a bottom wall 372, and opposite side walls 374 and 376 (see FIG. 4) coupled to and extending from the front wall 366 of the transition duct 26 to a front wall of the duct 252 of the HRSG 16. The top wall 370, the bottom wall 372, and the opposite side walls 374 and 376 are coupled together to define a rectangular perimeter of the transition duct 26. In the illustrated embodiment, the top wall 370, the bottom wall 372, and the opposite side walls 374 and 376 generally diverge and turn from the axial-radial diffuser 24 to the HRSG 16.

In the illustrated embodiment, each of the expansion stages 360, 362, and 364 includes portions of the top wall 370, the bottom wall 372, and the opposite side walls 374 and 376. For example, the expansion stage 360 includes a first stage wall including a top wall 378 (e.g., top wall portion of top wall 370), a bottom wall 380 (e.g., bottom wall portion of bottom wall 372), and opposite side walls 382 and 384 (e.g., side wall portions of side walls 374 and 376, see FIG. 4) extending over a first axial distance 385 in the axial direction 30. The expansion stage 362 includes a second stage wall including a top wall 386 (e.g., top wall portion of top wall 370), a bottom wall 388 (e.g., bottom wall portion of bottom wall 372), and opposite side walls 390 and 392 (e.g., side wall portions of side walls 374 and 376, see FIG. 4) extending over a second axial distance 393 in the axial direction 30. The expansion stage 364 includes a third stage wall including a top wall 394 (e.g., top wall portion of top wall 370), a bottom wall 396 (e.g., bottom wall portion of bottom wall 372), and opposite side walls 398 and 400 (e.g., side wall portions of side walls 374 and 376, see FIG. 4) extending over a third axial distance 401 in the axial direction 30. The side walls 374 and 376 (e.g., side walls 382, 384, 390, 392, 398, and 400) generally diverge away from the central axis 270 in the flow direction from the axial-radial diffuser 24 toward the HRSG 16 as discussed in further detail below with reference to FIG. 4. Additionally, the top and bottom walls 370 and 372 generally turn in an upward direction from the axial-radial diffuser 24 toward the HRSG 16.

In the expansion stage 360, the top wall 378 is oriented at an angle 402 relative to the central axis 270, the bottom wall 380 includes a bottom wall portion 404 oriented at an angle 406 relative to the central axis 270, and the bottom wall 380 includes a bottom wall portion 408 parallel to the central axis 270. The angles 402 and 406 may be the same or different from one another, wherein the angle 402 is oriented upwardly away from the central axis 270 and the angle 406 is oriented downwardly away from the central axis 270 in the axial direction 30 toward the HRSG 16. In other words, the top wall 378 and the bottom wall portion 404 generally diverge away from the central axis 270 and away from one another in the axial direction 30 toward the HRSG 16. In certain embodiments, the angle 402 may be greater than or less than the angle 406. For example, the angle 402 may be between about 20 to 50 degrees, and the angle 406 may be between about 10 to 40 degrees.

Figure 4:
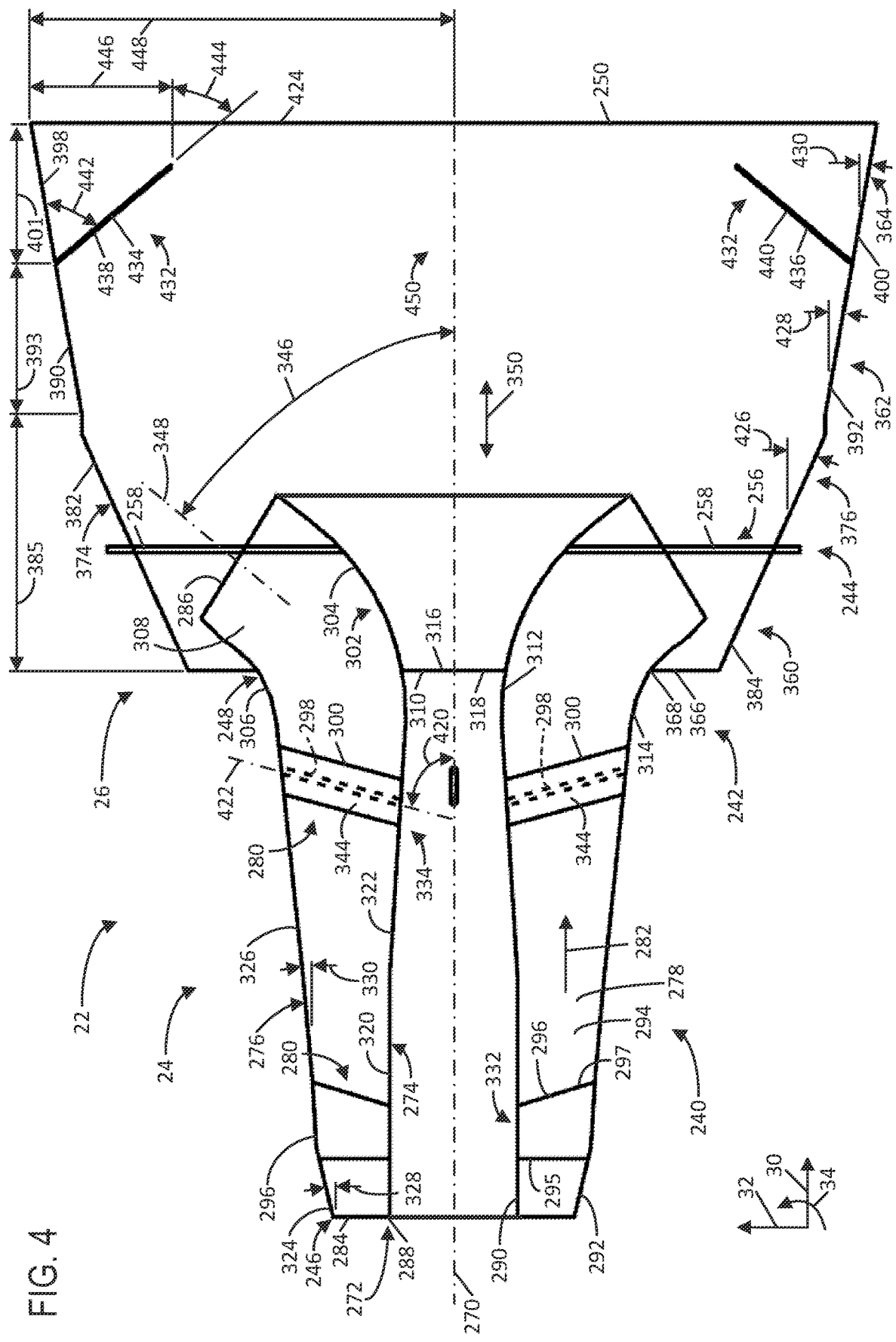
FIG. 4 is a schematic top view of an embodiment of the exhaust diffuser system of FIGS. 1-3, further illustrating details of the axial-radial diffuser and the transition duct of the exhaust diffuser system.

The top wall 378 extends over the first axial distance 385 of the expansion stage 360, while the bottom wall portions 404 and 408 collectively extend over the first axial distance 385 of the expansion stage 360. Additionally, the expansion stage 360 of the transition duct 26 extends over the first axial distance 385 overlapping with the radial diffuser portion 242, including the outlet 286. In the illustrated embodiment, the outlet 286 is generally directed at an angle toward the top wall 370 and the bottom wall 372. The top wall 378 and the bottom wall portion 404 generally diverge in the vicinity of the outlet 286 to help diffuse the exhaust gas 152 into the transition duct 26, while the bottom wall portion 408 is parallel to start a transition of the top and bottom walls 370 and 372 to an upward incline in the expansion stages 362 and 364. As illustrated in FIG. 4, the side walls 382 and 384 also diverge in the expansion stage 360. Collectively, the top wall 378, the bottom wall portion 404, and the side walls 382 and 384 (see FIG. 4) provide an expanding cross-sectional area to help diffuse and uniformly distribute the exhaust gas 152 into the transition duct 26.

In the expansion stage 362, the top wall 386 is oriented at an angle 410 relative to the central axis 270, and the bottom wall 388 is oriented at an angle 412 relative to the central axis 270. The angles 410 and 412 may be the same or different from one another, wherein the angle 410 is oriented upwardly away from the central axis 270, and the angle 412 is oriented upwardly toward the central axis 270 in the axial direction 30 toward the HRSG 16. Thus, the transition duct 26 along the expansion stage 362 may be described as inclined or angled (e.g., upwardly inclined or angled) relative to the central axis 270. In other words, the top wall 386 and the bottom wall 388 generally turn the transition duct 26 in an upwardly angled direction (e.g., angles 410 and 412) to turn the flow of the exhaust gas 152 in the upwardly angled direction from the radial diffuser portion 242 toward the HRSG 16 (e.g., upwardly angled flow path of the exhaust gas 152).

In certain embodiments, the angle 410 may be greater than or less than the angle 412. For example, the angle 410 may be between about 25 to 65 degrees, and the angle 412 may be between about 20 to 60 degrees. Additionally, the angle 410 of the top wall 386 may be greater than the angle 402 of the top wall 378, such as at least 1, 2, 3, 4, 5, 6, 7, 8, 9, 10, 11, 12, 13, 14, or 15 degrees greater than the angle 402. Similarly, the angle 412 of the bottom wall 388 may be greater than the angle 402 of the top wall 378, such as at least 1, 2, 3, 4, 5, 6, 7, 8, 9, 10, 11, 12, 13, 14, or 15 degrees greater than the angle 402.

As illustrated in FIG. 4, the side walls 390 and 392 also diverge in the expansion stage 362. Collectively, the expansion stage 362 provides a flow path that is upwardly angled by the top and bottom walls 386 and 388 and diverging by the opposite side walls 390 and 392, thereby helping to further diffuse and uniformly distribute the flow of the exhaust gas 152 downstream from the expansion stage 360 that receives the exhaust gas 152 from the outlet 286 of the radial diffuser portion 242.

In the expansion stage 364, the top wall 394 is oriented at an angle 414 relative to the central axis 270, and the bottom wall 396 is oriented at an angle 416 relative to the central axis 270. The angles 414 and 416 may be the same or different from one another, wherein the angle 414 is oriented upwardly away from the central axis 270, and the angle 416 is oriented upwardly toward the central axis 270 in the axial direction 30 toward the HRSG 16. Thus, the transition duct 26 along the expansion stage 364 may be described as inclined or angled (e.g., upwardly inclined or angled) relative to the central axis 270. In other words, the top wall 394 and the bottom wall 396 generally turn the transition duct 26 in an upwardly angled direction (e.g., angles 414 and 416) to turn the flow of the exhaust gas 152 in the upwardly angled direction from the radial diffuser portion 242 toward the HRSG 16 (e.g., upwardly angled flow path of the exhaust gas 152).

In certain embodiments, the angle 414 may be greater than or less than the angle 416. For example, the angle 414 may be between about 35 to 75 degrees, and the angle 416 may be between about 20 to 60 degrees, wherein the angle 414 may be at least 1, 2, 3, 4, 5, 6, 7, 8, 9, 10, 11, 12, 13, 14, or 15 degrees greater than the angle 416. Additionally, the angle 414 of the top wall 394 may be greater than the angle 402 of the top wall 378 and the angle 410 of the top wall 386. For example, the angle 414 of the top wall 394 may be at least 1, 2, 3, 4, 5, 6, 7, 8, 9, 10, 11, 12, 13, 14, or 15 degrees greater than the angle 410. The angle 416 of the bottom wall 396 may be equal to, less than, or greater than the angle 412 of the bottom wall 388.

As illustrated in FIG. 4, the side walls 398 and 400 also diverge in the expansion stage 364. Collectively, the expansion stage 364 provides a flow path that is upwardly angled by the top and bottom walls 394 and 396 and diverging by the opposite side walls 398 and 400, thereby helping to further diffuse and uniformly distribute the flow of the exhaust gas 152 downstream from the expansion stage 364 and into the duct 252 of the HRSG 16. Additional aspects of the axial-radial diffuser 24 and the transition duct 26 are discussed in further detail below with reference to FIG. 4.

FIG. 4 is a schematic top view of an embodiment of the exhaust diffuser system 22 of FIGS. 1-3, further illustrating details of the axial-radial diffuser 24 and the transition duct 26 of the exhaust diffuser system 22. The exhaust diffuser system 22 is the same as described above with reference to FIGS. 1-3, and thus like element numbers are used in FIG. 4. Additional aspects of the radial supports 280 of the axial-radial diffuser 24, the support structure 244, the side walls 374 and 376 of the transition duct 26, and interior features in the transition duct 26 are discussed in detail below.

As illustrated in FIG. 4, the radial supports 280 (e.g., 296, 298, and 300) extend in opposite radial directions 32 (e.g., opposite lateral directions) from the inner wall 290 toward the outer wall 292. As discussed above, the radial supports 280 may include any number (e.g., 2, 3, 4, 5, 6, 7, 8, 9, 10 or more) and configuration (e.g., symmetric or asymmetric) of the radial supports 296, 298, and 300. In the illustrated embodiment, the radial supports 298 and 300 may be oriented at an angle 420 between the central axis 270 and a central axis 422 of the radial supports 298 and 300. For example, the angle 420 may be an acute angle of 60 to 80 degrees. Additionally, the radial supports 298 and 300 may be oriented at the same or different angles 420, the same or different axial positions in the axial direction 30 along the central axis 270, the same or different circumferential positions in the circumferential direction 34 about the central axis 34, or any combination thereof. In certain embodiments, at least some of the radial supports 298 and 300 may be arranged in a nested configuration with a radial support 298 extending internally through a radial support 300, and/or at least some of the radial supports 298 and 300 may be arranged independently in the axial-radial diffuser 24 (e.g., circumferentially spaced apart).

The support structure 244 includes the framework 256 having the plurality of supports 258 extending laterally in opposite directions toward and/or beyond the side walls 374 and 376 of the transition duct 26. For example, the plurality of supports 258 may extend internally through and/or externally outside of the transition duct 26 between the central hub 302 of the radial diffuser portion 242 and the base 254 (see FIGS. 2 and 3). The plurality of supports 258 may include horizontal supports, vertical supports, and/or angled supports (e.g., acutely angled supports) relative to the base 254. As illustrated in FIG. 4, the plurality of supports 258 may extend from the inner wall 304 of the radial diffuser portion 242, through the outlet 286, through the transition duct 26 (e.g., through one or more walls), and to the base 254. In certain embodiments, as discussed in detail above, the support structure 244 may be configured to hold the radial diffuser portion 242 in a fixed position and/or enable movement of the central hub 302 via the flow passage area adjustment system 260 (see FIGS. 2 and 3) to adjust a flow area of the exhaust gas 152 through the radial diffuser portion 242.

The side walls 374 and 376 of the transition duct 26 generally diverge away from the central axis 270 in the downstream direction of flow of the exhaust gas 152 from the axial-radial diffuser 24 toward an outlet 424 (e.g., rectangular outlet) of the transition duct 26. In the illustrated embodiment, the side walls 382 and 384 are oriented at an angle 426 relative to the central axis 270, the side walls 390 and 392 are oriented at an angle 428 relative to the central axis 270, and the side walls 398 and 400 are oriented at an angle 430 relative to the central axis 270. The angles 426, 428, and 430 may be same or different (e.g., greater or lesser) from one another. In the illustrated embodiment, the angle 426 is greater than the angles 428 and 430, thereby providing a more rapid expansion of the exhaust gas 152 in the expansion stage 360 disposed about the outlet 286 of the radial diffuser portion 242. For example, the angle 426 may be at least 5, 10, 15, 20, 25, or 30 degrees greater than the angles 428 and 430. The angle 428 may be the same or different (e.g., greater or lesser than) the angle 430. In certain embodiments, the angle 426 may be about 20 to 60 degrees, 25 to 50 degrees, or 30 to 40 degrees, and the angles 428 and 430 may be about 5 to 40 degrees, 10 to 30 degrees, or 15 to 25 degrees.

In addition to the angles 426, 428, and 430, the axial lengths 385, 393, and 401 of the expansion stages 360, 362, and 364 may be the same or different (e.g., greater or lesser) from one another. For example, the axial length 385 of the expansion stage 360 may be equal to, greater than, or less than the axial length 393 of the expansion stage 362, and/or the axial length 401 of the expansion stage 364. The axial length 393 of the expansion stage 362 may be equal to, greater than, or less than the axial length 385 of the expansion stage 360 and/or the axial length 401 of the expansion stage 364. The axial length 401 of the expansion stage 364 may be equal to, greater than, or less than the axial length 385 of the expansion stage 360 and/or the axial length 393 of the expansion stage 364. In the illustrated embodiment, the axial length 385 of the expansion stage 360 is greater than each of the axial length 385 of the expansion stage 360 and the axial length 401 of the expansion stage 364, and the axial length 393 of the expansion stage 362 is greater than the axial length 401 of the expansion stage 364.

The transition duct 26 also may include one or more internal flow conditioners 432, such as flow conditioners 434 and 436 coupled to the opposite side walls 374 and 376. In the illustrated embodiment, the internal flow conditioners 432 (e.g., flow conditioners 434 and 436) are coupled to the opposite side walls 398 and 400 in the expansion stage 362. However, the internal flow conditioners 432 may include one or more flow conditioners disposed in each of the expansion stages 360, 362, and 364, coupled to any of the walls (e.g., top, bottom, and side walls), or any combination thereof. The internal flow conditioners 432 (e.g., flow conditioners 434 and 436) may include perforated baffles 438 and 440 (e.g., perforated plates) having a plurality of openings to enable at least some flow of the exhaust gas 152 through the perforated baffles 438 and 440. The openings may include hundreds or thousands of openings, which may be sized from 1 to 50 mm in diameter.

The perforated baffles 438 and 440 may be oriented at an angle 442 relative to the side walls 374 and 376 (e.g., side walls 398 and 400), such as between 20 to 90 degrees, 30 to 85 degrees, 40 to 80 degrees, or 50 to 75 degrees. For example, the angle 442 may be at least equal to or greater than 20, 30, 40, 50, 60, 70, or 80 degrees. The perforated baffles 438 and 440 also may be oriented at an angle 444 relative to the central axis 270, such as an acute angle between 10 to 70 degrees, 20 to 60 degrees, or 30 to 50 degrees. The angle 444 may be oriented in a downstream direction toward the outlet 424 of the transition duct 26.

The perforated baffles 438 and 440 also may extend a radial distance 446 in the radial direction 32 from the side walls 398 and 400 toward the central axis 270. The radial distance 446 of the perforated baffles 438 and 440 may be between 5 to 60 percent, 10 to 50 percent, or 15 to 40 percent of a radial distance 448 between the side walls 398 and 400 and the central axis 270 at the location of the perforated baffles 438 and 440. In operation, the perforated baffles 438 and 440 are configured to help redirect at least some of the flow of the exhaust gas 152 away from the side walls 374 and 376 toward a central region 450 of the transition duct 26, wherein the central region 450 includes or crosses over the central axis 270. However, the openings in the perforated baffles 438 and 440 still allow some of the flow of the exhaust gas 152 to pass through the perforated baffles 438 and 440 and flow along the side walls 374 and 376.

Accordingly, the perforated baffles 438 and 440 are configured to help provide a more uniformly distributed flow of the exhaust gas 152 before discharge through the outlet 424 into the HRSG 16.

Figure 5:
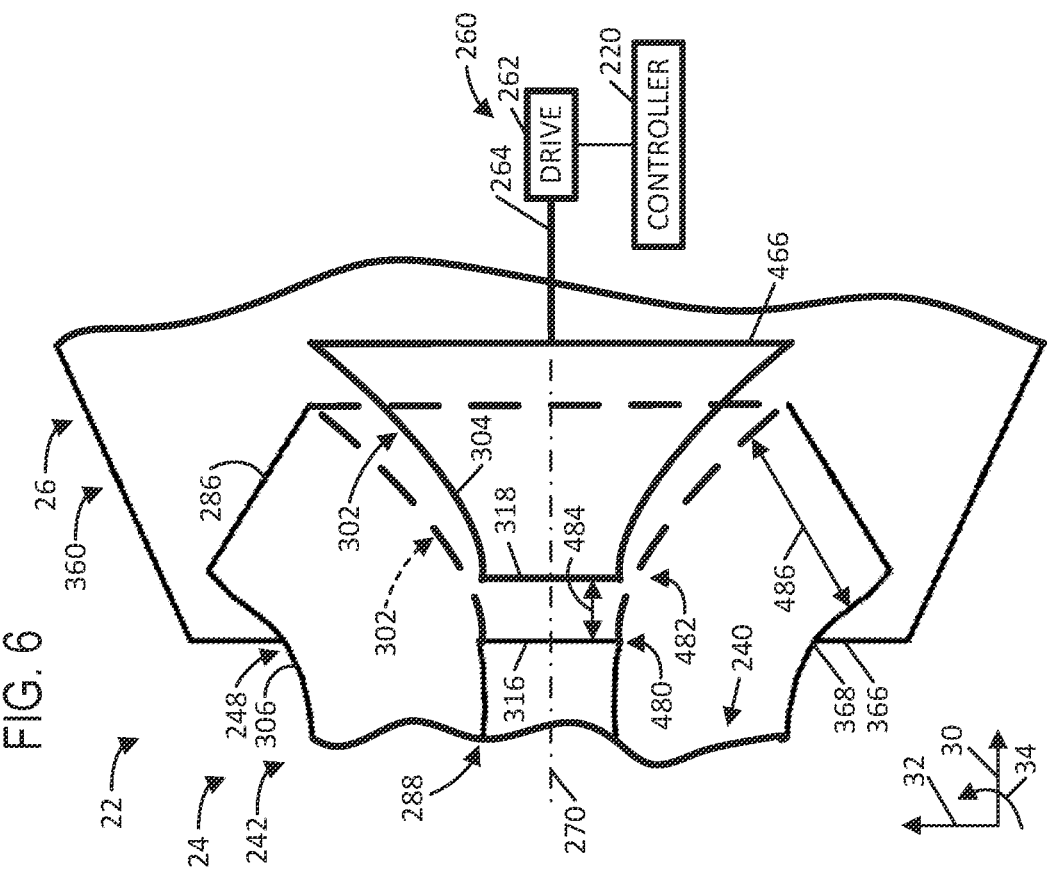
FIG. 5 is a partial schematic side view of an embodiment of the exhaust diffuser system of FIGS. 1-4, further illustrating details of a radial diffuser portion of the axial-radial diffuser and the transition duct of the exhaust diffuser system, in which the radial diffuser portion includes perforated wall portions in the central hub.

FIG. 5 is a partial schematic side view of an embodiment of the exhaust diffuser system 22 of FIGS. 1-4, further illustrating details of the radial diffuser portion 242 of the axial-radial diffuser 24 and the transition duct 26 of the exhaust diffuser system 22, wherein the radial diffuser portion 242 includes perforated wall portions 460 in the central hub 302. In certain embodiments, the central hub 302 of FIGS. 1-4 may include or exclude the perforated wall portions 460. As illustrated in FIG. 5, the perforated wall portions 460 include a perforated wall portion 462 in the inner wall 304 of the central hub 302, and a perforated wall portion 464 in the central end plate 466.

The perforated wall portion 462 may include an annular wall portion (e.g., curved annular wall portion) of the inner wall 304, wherein the perforated wall portion 462 includes a plurality of perforations or openings 468. Similarly, the perforated wall portion 464 may include a disc-shaped portion of the central end plate 466, wherein the perforated wall portion 464 includes a plurality of perforations or openings 470. In operation, a portion of the flow of the exhaust gas 152 may flow through the openings 468 in the perforated wall portion 462, through a central cavity or passage 472 inside the central hub 302, and out through the openings 470 in the central end plate 466 toward the central region 450 of the transition duct 26. Accordingly, the perforated wall portions 460 (e.g., perforated wall portions 462 and 464) direct at least some of the exhaust gas 152 into the central region 450, thereby helping to avoid a low velocity zone in the central region 450 downstream of the central hub 302. Thus, the perforated wall portions 460 (e.g., perforated wall portions 462 and 464) help to distribute the exhaust gas 152 more uniformly throughout the transition duct 26.

The perforated wall portions 460 (e.g., perforated wall portions 462 and 464) may include any number, size, and shape of the openings 468 and 470. For example, the openings 468 and 470 may include at least 10, 50, 100, 200, 300, 400, 500, 600, 700, 800, 900, 1000, or more openings. The openings 468 and 470 may be sized between 1 to 10 mm. The openings 468 and 470 may include circular, oval, square, triangular, or any other shape of opening. In some embodiments, the central hub 302 may exclude the central end plate 466, such that the central hub 302 has a single large opening instead of the central end plate 466.

Figure 6:
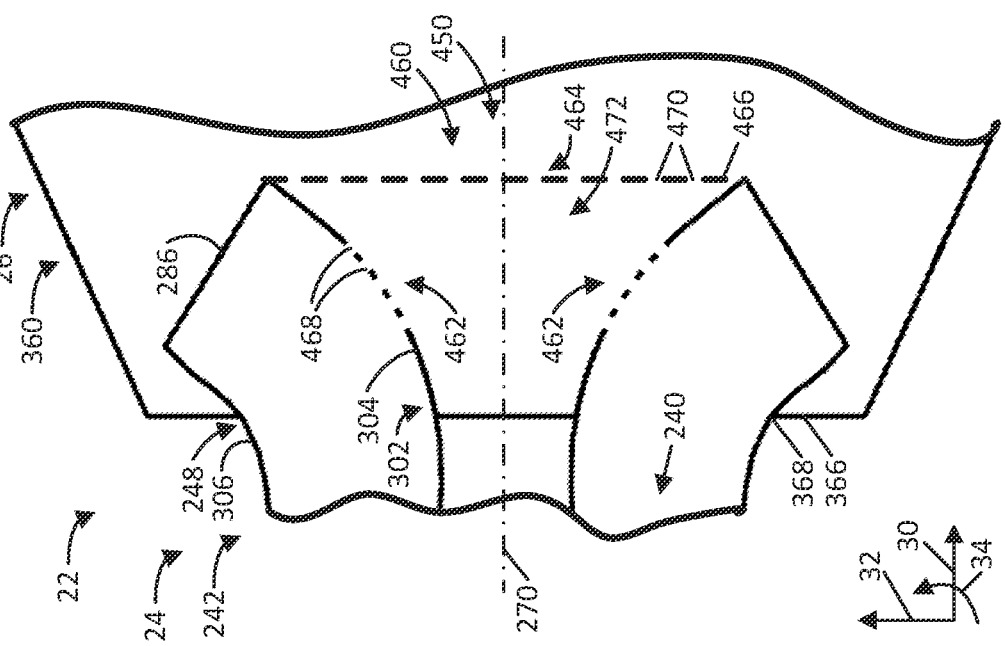
FIG. 6 is a partial schematic side view of an embodiment of the exhaust diffuser system of FIGS. 1-4, further illustrating details of a radial diffuser portion of the axial-radial diffuser and the transition duct of the exhaust diffuser system, in which a central hub of the radial diffuser portion is movable via a flow passage area adjustment system.

FIG. 6 is a partial schematic side view of an embodiment of the exhaust diffuser system 22 of FIGS. 1-4, further illustrating details of the radial diffuser portion 242 of the axial-radial diffuser 24 and the transition duct 26 of the exhaust diffuser system 22, wherein the central hub 302 of the radial diffuser portion 242 is movable (i.e., axially translatable) via the flow passage area adjustment system 260. In the illustrated embodiment, the central hub 302 is coupled (e.g., directly or indirectly) to the drive 262 via the transmission 264 of the flow adjustment 260. As discussed above, the transmission 264 may be coupled directly to the central hub 302 or indirectly via the support structure 244. However, in either configuration, the drive 262 is controlled by the controller 220 to transfer motion through the transmission 264 to the central hub 302, thereby enabling axial movement of the central hub 302 between a first position 480 adjacent the axial diffuser portion 240 and a second position 482 axially offset away from the axial diffuser portion 240 as indicated by axial offset distance 484. As the central hub 302 moves axially from the first position 480 toward the second position 482, a cross-sectional area 486 defined by the inner wall 302 and the outer wall 306 of the radial diffuser portion 242 increases to cause an increasing flow area through the radial diffuser portion 242. As the central hub 302 moves axially from the second position 482 toward the first position 480, the cross-sectional area 486 decreases to cause a decreasing flow area through the radial diffuser portion 242. Accordingly, the controller 220 may control the drive 262 of the flow passage area adjustment system 260 to adjust the flow area through the radial diffuser portion 242 into the transition duct 26, thereby helping to adjust the distribution of the exhaust gas into the transition duct 26 and to help adjust the diffusion and/or flow conditioning through the transition duct 26.

Figure 7:
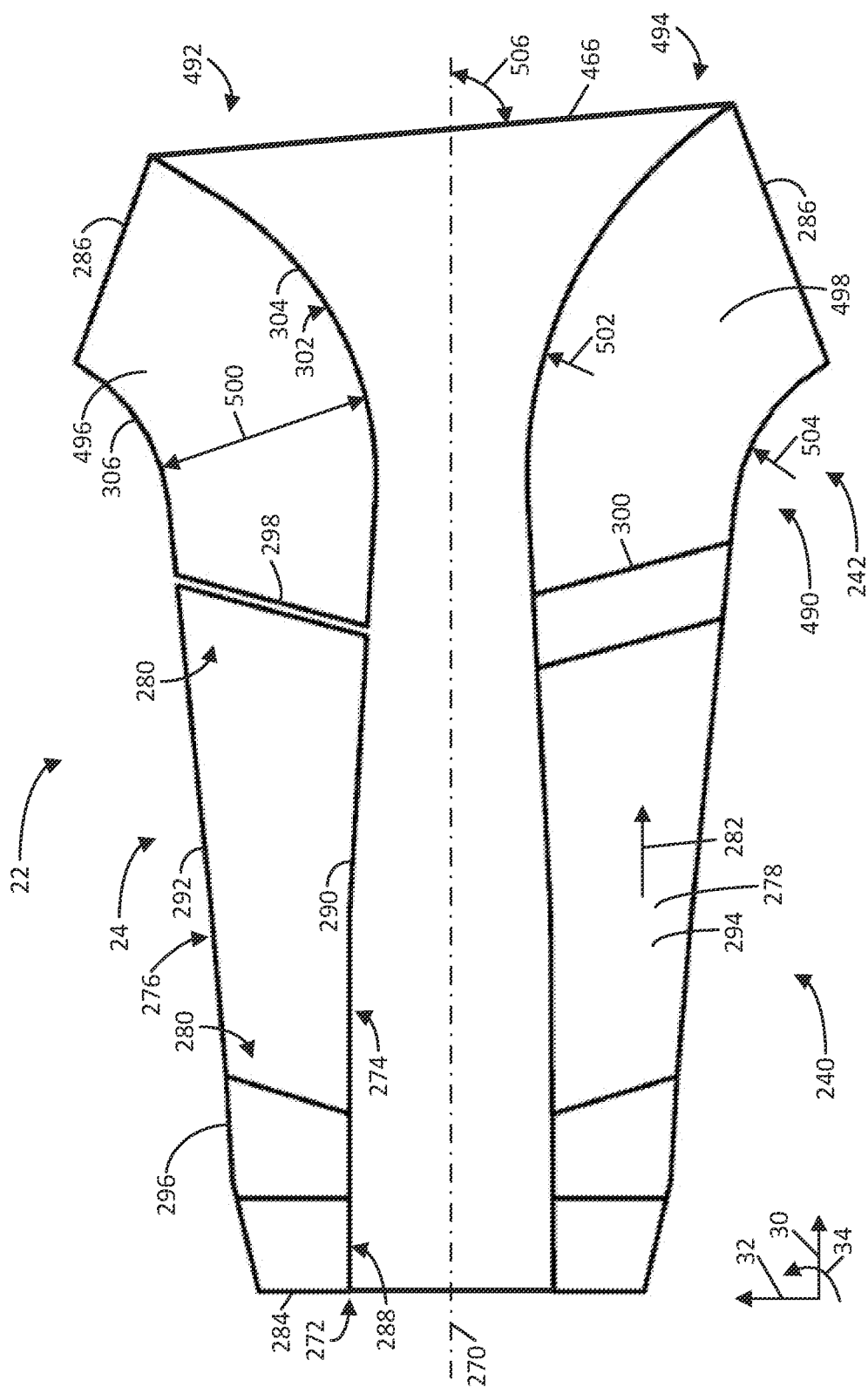
FIG. 7 is a schematic side view of an embodiment of the exhaust diffuser system of FIGS. 1-6, further illustrating details of the radial diffuser portion of the axial-radial diffuser having an asymmetric configuration.

FIG. 7 is a schematic side view of an embodiment of the exhaust diffuser system of FIGS. 1-6, further illustrating details of the radial diffuser portion 242 of the axial-radial diffuser 24. Unless stated or shown otherwise, the axial-radial diffuser 24 is the same as described above with reference to FIGS. 1-6, and thus like element numbers are used in FIG. 7. As illustrated in FIG. 7, the axial-radial diffuser 24 has an asymmetric configuration 490 about the central axis 270, wherein a first portion 492 (e.g., upper portion) differs from a second portion 494 (e.g., lower portion) on opposite sides of the central axis 270. For example, the flow passage 278 may differ between the first and second portions 492 and 494, such that the flow passage 278 includes a first passage portion 496 (e.g., upper passage portion) in the first portion 492 and a second passage portion 498 (e.g., lower passage portion) in the second portion 494.

In the illustrated embodiment, the radial diffuser portion 242 may include a plurality of geometrical variations (e.g., progressively or continuously changing) in the circumferential direction 34 about the central axis 270, including but not limited to a distance 500 between the inner and outer walls 304 and 306, a radius 502 of curvature of the inner wall 304, a radius 504 of curvature of the outer wall, or any combination thereof. In certain embodiments, the distance 500 may be measured along a line perpendicular to the outer wall 306 and extending to the inner wall 304. However, at the outlet 286, the distance 500 may be measured from an end of the outer wall 306 to an end of the inner wall 304. At any particular axial position along the central axis 270, the distance 500 between the inner and outer walls 304 and 306 may alternatingly increase and decrease in the circumferential direction 34 about the central axis 270. In certain embodiments, the distance 500 may reach a minimum at the first portion 492 and a maximum at the second portion 494. For example, at the outlet 486, the distance 500 may be a minimum at the first portion 492 diametrically opposite from a maximum at the second portion 494.

The variation in the distance 500 may be achieved at least in part by variations in the radius 502 of the inner wall 304 and/or variations in the radius 504 of the outer wall 306. In some embodiments, at any particular axial position along the central axis 270, the radius 502 of the inner wall 304 may be variable while the radius 504 of the outer wall 306 may be constant in the circumferential direction 34 about the central axis 270, or the radius 502 of the inner wall 304 may be constant while the radius 504 of the outer wall 306 may be variable in the circumferential direction 34 about the central axis 270. In the illustrated embodiment, the distance 500 is variable, and the radius 502 of the inner wall 304 is variable in the circumferential direction 34 about the central axis 270, such that the passage 278 and the outlet 286 vary between the first and second portions 492 and 494 (e.g., upper and lower portions). For example, the outlet 286 and the first passage portion 496 of the passage 278 in the first portion 492 (e.g., upper portion) may be smaller or more restricted as compared to the outlet 286 and the second passage portion 498 in the second portion 494 (e.g., lower portion 494).

The variations in the distance 500 and the radius 502 of the inner wall 304 also may result in the central end plate 466 being oriented at an angle 506 relative to the central axis 270. For example, the central end plate 466 may be angled in the downstream direction from the first portion 492 to the second portion 494, wherein the angle 506 may be an acute angle between 60 to 85 degrees or between 65 to 75 degrees. Thus, the central end plate 466 may be described as an inclined central end plate.

Overall, the asymmetric configuration 490 of the axial-radial diffuser 24 of FIG. 7 may be configured to distribute more of the flow of exhaust gas 152 toward a bottom portion of the transition duct 26 and less of the flow of exhaust gas 152 toward an upper portion of the transition duct 26 to help diffuse and distribute the exhaust gas 152 more uniformly throughout the transition duct 26. In some embodiments, the axial-radial diffuser 24 may use the asymmetric configuration 490 of FIG. 7 in a reversed orientation (e.g., rotated 180 degrees about the central axis 270) or a sideways orientation (e.g., rotated 90 degrees about the central axis 270). The axial-radial diffuser 24 of FIG. 7 may be used with all aspects of the exhaust diffuser system 22 illustrated and described herein with reference to FIGS. 1-8.

FIG. 8 is a schematic side view of an embodiment of the exhaust diffuser system of FIGS. 1-6, further illustrating details of the radial diffuser portion 242 of the axial-radial diffuser 24. Unless stated or shown otherwise, the axial-radial diffuser 24 is the same as described above with reference to FIGS. 1-6, and thus like element numbers are used in FIG. 8. As illustrated in FIG. 8, the axial-radial diffuser 24 has an S-curved profile 520 about the central axis 270, wherein the S-curved profile 520 includes an inner S-curved profile 522 of the inner wall 304 and an outer S-curved profile 524 of the outer wall 306 extending in the circumferential direction 34 about the central axis 270. The inner S-curved profile 522 includes an inwardly curved or concave profile 526 transitioning into an outwardly curved or convex profile 528 in the flow direction 282 along the central axis 270, wherein the inner S-curved profile 522 (e.g., with profiles 526 and 528) extends in the circumferential direction 34 about the central axis 270. Similarly, the outer S-curved profile 524 includes an inwardly curved or concave profile 530 transitioning into an outwardly curved or convex profile 532 in the flow direction 282 along the central axis 270, wherein the outer S-curved profile 524 (e.g., with profiles 530 and 532) extends in the circumferential direction 34 about the central axis 270. In certain embodiments, the inner and outer S-curved profiles 522 and 524 are symmetric about the central axis 270. However, in some embodiments, the inner and outer S-curved profiles 522 and 524 are asymmetric about the central axis 270, such as in combination with the asymmetric configuration 490 of FIG. 7.

In operation, the inwardly curved profiles 526 and 530 of the inner and outer S-curved profiles 522 and 524 may be configured to provide the initial radial diffusion of the exhaust gas 152 from the axial diffuser portion 240, while the outwardly curved profiles 528 and 532 of the inner and outer S-curved profiles 522 and 524 may be configured to continue the radial diffusion and begin transitioning the flow of the exhaust gas 152 for discharge into the expansion stage 360 of the transition duct 26. In other words, the inwardly curved profiles 526 and 530 may be configured to turn the flow of the exhaust gas 152 from the axial direction 30 toward the radial direction 32, while the outwardly curved profiles 528 and 532 may be configured to turn the flow of the exhaust gas 152 from the radial direction 32 toward the axial direction 30. In the illustrated embodiment, the radius 502 of the inner wall 304 may continuously vary in the flow direction 282 along the inwardly curved profile 526 followed by the outwardly curved profile 528, and the radius 504 of the outer wall 306 may continuously vary in the flow direction 282 along the inwardly curved profile 530 followed by the outwardly curved profile 532. The axial-radial diffuser 24 of FIG. 8 may be used with all aspects of the exhaust diffuser system 22 illustrated and described herein with reference to FIGS. 1-7.

Technical effects of the invention include an exhaust diffuser system 22 having an axial-radial diffuser 24 coupled to a transition duct 26, which helps to diffuse an exhaust gas 152 between a gas turbine system 12 and a HRSG 16 in a reduced footprint to allow space for various gas treatment equipment. Embodiments of the exhaust diffuser system 22 have a reduced length by using the axial-radial diffuser 24 rather than only an axial diffuser. The axial-radial diffuser 24 may be adjustable to adjust a flow area and exhaust gas distribution into the transition duct 24, such as via a flow passage area adjustment system 260 coupled to a central hub 302 of a radial diffuser portion 242. The radial diffuser portion 242 also may include a perforated wall portions 460 to avoid low velocity regions downstream from the radial diffuser portion 242, an asymmetric configuration 490 to help distribute the exhaust gas 152 into the transition duct 26, and an S-curved profile 520 configured to help transition the flow of the exhaust gas 152 from the radial diffuser portion 242 into the transition duct 26. The transition duct 26 also may include a plurality of expansion stages 360, 362, and 364 configured to gradually expand and turn the flow of the exhaust gas 152 from the axial-radial diffuser 24 to the HRSG 16. The transition duct 26 also may include internal flow conditioners 432 configured to help direct the flow of the exhaust gas 152 away from walls of the transition duct 26 and distribute the flow of the exhaust gas 152 more uniformly upstream from the HRSG 16.

The subject matter described in detail above may be defined by one or more clauses, as set forth below.

A system includes an exhaust diffuser system having an axial-radial diffuser and a transition duct. The axial-radial diffuser includes an inlet, an outlet, an axial diffuser portion between the inlet and the outlet, and a radial diffuser portion between the axial diffuser portion and the outlet, wherein the inlet is configured to couple to a gas turbine system. The transition duct is coupled to the axial-radial diffuser, wherein the outlet is disposed inside of an intake portion of the transition duct, and the transition duct includes a discharge portion configured to couple to a heat recovery steam generator (HRSG).

The system of the preceding clause, including the gas turbine system coupled to the exhaust diffuser system, the HRSG coupled to the exhaust diffuser system, a gas treatment system having a gas capture system downstream from the HRSG, or a combination thereof.

The system of any preceding clause, wherein the transition duct is upwardly inclined from the axial-radial diffuser to a duct of the HRSG.

The system of any preceding clause, wherein the transition duct has a cross-sectional area that expands in a flow direction from the axial-radial diffuser to the HRSG.

The system of any preceding clause, wherein the transition duct includes a plurality of expansion stages having different rates of expansion of the cross-sectional area.

The system of any preceding clause, wherein the intake portion includes a first expansion stage of the plurality of expansion stages, wherein a first stage wall of the transition duct along the first expansion stage diverges away from a central axis of the axial-radial diffuser around the central axis.

The system of any preceding clause, wherein the first stage wall includes a first top wall, a first bottom wall, and first opposite side walls that diverge away from the central axis.

The system of any preceding clause, wherein a second expansion stage of the plurality of expansion stages includes second opposite side walls that diverge away from the central axis.

The system of any preceding clause, wherein the discharge portion includes a third expansion stage of the plurality of expansion stages, and the third expansion stage includes third opposite side walls that diverge away from the central axis.

The system of any preceding clause, wherein the second expansion stage includes second top and bottom walls that are upwardly inclined relative to the central axis, and the third expansion stage includes third top and bottom walls that are upwardly inclined relative to the central axis.

The system of any preceding clause, wherein the transition duct includes a plurality of perforated baffles oriented at an acute angle relative to a central axis of the axial-radial diffuser.

The system of any preceding clause, wherein the axial diffuser portion includes a first central hub having a first inner wall disposed about a central axis, a first outer wall disposed about the first inner wall, and a first exhaust passage between the first inner and outer walls, wherein the radial diffuser portion includes a second central hub having a second inner wall disposed about the central axis, a second outer wall disposed about the second inner wall, a second exhaust passage between the second inner and outer walls and fluidly coupled to the first exhaust passage, wherein the radial diffuser portion turns outward away from the central axis from the axial diffuser portion to the outlet.

The system of any preceding clause, wherein the axial diffuser portion includes a first plurality of radial supports between the first inner and outer walls at a first axial position along the central axis, and a second plurality of radial supports between the second inner and outer walls at a second axial position along the central axis, wherein the second plurality of radial supports includes one or more radial supports with a manway and one or more radial supports without a manway.

The system of any preceding clause, including a support structure extending from the radial diffuser portion to a base.

The system of any preceding clause, wherein the support structure includes first and second supports extending from the second central hub to the base.

The system of any preceding clause, wherein the second inner wall of the second central hub includes a perforated wall portion.

The system of any preceding clause, wherein the second central hub is coupled to a drive of a flow passage area adjustment system, and the drive is configured to move the second central hub to adjust flow between the second inner and outer walls.

The system of any preceding clause, wherein the radial diffuser portion is asymmetric about a central axis of the axial-radial diffuser.

A method includes diffusing an exhaust gas from a gas turbine system through an axial-radial diffuser of an exhaust diffuser system. The axial-radial diffuser includes an inlet, an outlet, an axial diffuser portion between the inlet and the outlet, and a radial diffuser portion between the axial diffuser portion and the outlet, wherein the inlet is coupled to the gas turbine system. The method also includes transitioning the exhaust gas from the radial diffuser portion to a heat recovery steam generator (HRSG) through a transition duct of the exhaust diffuser system. The transition duct is coupled to the axial-radial diffuser, the outlet is disposed inside of an intake portion of the transition duct, and the transition duct includes a discharge portion coupled to the HRSG.

A system includes an exhaust diffuser system configured to mount between a gas turbine system and a heat recovery steam generator (HRSG). The exhaust diffuser system includes a radial diffuser portion having a central hub with an inner wall disposed about a central axis, an outer wall disposed about the inner wall, and an exhaust passage between the inner and outer walls. The exhaust diffuser system includes a flow passage area adjustment system having a drive coupled to the central hub of the radial diffuser portion. The exhaust diffuser system also includes a controller coupled to the drive, wherein the controller is configured to control the drive to move the central hub of the radial diffuser portion to adjust a flow through the radial diffuser portion.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   an exhaust diffuser system, comprising:
      an axial-radial diffuser comprising an inlet, an outlet, an axial diffuser portion between the inlet and the outlet, and a radial diffuser portion between the axial diffuser portion and the outlet, wherein the radial diffuser portion increases in a first cross-sectional area in a first flow direction toward the outlet, and the inlet is configured to couple to a gas turbine system; and
      a transition duct coupled to the axial-radial diffuser, wherein the outlet is disposed inside of an intake portion of the transition duct, the transition duct comprises a discharge portion configured to couple to a heat recovery steam generator (HRSG), the transition duct has a second cross-sectional area that expands in a second flow direction from the axial-radial diffuser to the HRSG, and the transition duct comprises a plurality of expansion stages having different rates of expansion of the second cross-sectional area.

2. The system of claim 1, comprising the gas turbine system coupled to the exhaust diffuser system, the HRSG coupled to the exhaust diffuser system, a gas treatment system having a gas capture system downstream from the HRSG, or a combination thereof.

3. The system of claim 1, wherein the transition duct is upwardly inclined from the axial-radial diffuser to a duct of the HRSG.

4. The system of claim 1, wherein the intake portion comprises a first expansion stage of the plurality of expansion stages, wherein a first stage wall of the transition duct along the first expansion stage diverges away from a central axis of the axial-radial diffuser around the central axis.

5. The system of claim 4, wherein the first stage wall comprises a first top wall, a first bottom wall, and first opposite side walls that diverge away from the central axis.

6. The system of claim 5, wherein a second expansion stage of the plurality of expansion stages comprises second opposite side walls that diverge away from the central axis.

7. The system of claim 6, wherein the discharge portion comprises a third expansion stage of the plurality of expansion stages, and the third expansion stage comprises third opposite side walls that diverge away from the central axis.

8. The system of claim 7, wherein the second expansion stage comprises second top and bottom walls that are upwardly inclined relative to the central axis, and the third expansion stage comprises third top and bottom walls that are upwardly inclined relative to the central axis.

9. The system of claim 1, wherein the transition duct comprises a plurality of perforated baffles oriented at an acute angle relative to a central axis of the axial-radial diffuser.

10. The system of claim 9, wherein each of the plurality of perforated baffles comprises a perforated plate having a plurality of holes extending completely through the perforated plate.

11. The system of claim 9, wherein the plurality of perforated baffles comprises first and second perforated baffles disposed on opposite walls of the transition duct, and the first and perforated baffles are angled inwardly toward one another.

12. The system of claim 1, wherein the axial diffuser portion comprises a first central hub having a first inner wall disposed about a central axis, a first outer wall disposed about the first inner wall, and a first exhaust passage between the first inner and outer walls, wherein the radial diffuser portion comprises a second central hub having a second inner wall disposed about the central axis, a second outer wall disposed about the second inner wall, a second exhaust passage between the second inner and outer walls and fluidly coupled to the first exhaust passage, wherein the radial diffuser portion turns outward away from the central axis from the axial diffuser portion to the outlet.

13. The system of claim 12, wherein the axial diffuser portion comprises a first plurality of radial supports between the first inner and outer walls at a first axial position along the central axis, and a second plurality of radial supports between the first inner and outer walls at a second axial position along the central axis, wherein the second plurality of radial supports comprises one or more radial supports with a manway and one or more radial supports without a manway.

14. The system of claim 12, comprising a support structure extending from the radial diffuser portion to a base.

15. The system of claim 14, wherein the support structure comprises first and second supports extending from the second central hub to the base.

16. The system of claim 12, wherein the second inner wall of the second central hub comprises a perforated wall portion.

17. The system of claim 12, wherein the second central hub is coupled to a drive of a flow passage area adjustment system, and the drive is configured to move the second central hub to adjust flow between the second inner and outer walls.

18. The system of claim 1, wherein the radial diffuser portion is asymmetric about a central axis of the axial-radial diffuser.

19. The system of claim 1, wherein a top wall of the transition duct progressively increases in angle relative to a central axis of the transition duct from a first axial end portion to a second axial end portion of the transition duct.

20. The system of claim 1, wherein an angle of a central axis of the radial diffuser portion at the outlet of the axial-radial diffuser is between 40 to 70 degrees.

21. A system, comprising:
an exhaust diffuser system, comprising:
an axial-radial diffuser comprising an inlet, an outlet, an axial diffuser portion between the inlet and the outlet, and a radial diffuser portion between the axial diffuser portion and the outlet, wherein the radial diffuser portion increases in cross-sectional area in a flow direction toward the outlet, and the inlet is configured to couple to a gas turbine system; and
a transition duct coupled to the axial-radial diffuser, wherein the outlet is disposed inside of an intake portion of the transition duct, the transition duct comprises a discharge portion configured to couple to a heat recovery steam generator (HRSG), and the transition duct comprises a plurality of perforated baffles oriented at an acute angle relative to a central axis of the axial-radial diffuser.

22. The system of claim 21, wherein each of the plurality of perforated baffles comprises a perforated plate having a plurality of holes extending completely through the perforated plate.

23. The system of claim 21, wherein the plurality of perforated baffles comprises first and second perforated baffles disposed on opposite walls of the transition duct, and the first and perforated baffles are angled inwardly toward one another.

24. A system, comprising:
an exhaust diffuser system, comprising:
an axial-radial diffuser comprising an inlet, an outlet, an axial diffuser portion between the inlet and the outlet, and a radial diffuser portion between the axial diffuser portion and the outlet, wherein the radial diffuser portion increases in cross-sectional area in a flow direction toward the outlet, and the inlet is configured to couple to a gas turbine system; and
a transition duct coupled to the axial-radial diffuser, wherein the outlet is disposed inside of an intake portion of the transition duct, the transition duct comprises a discharge portion configured to couple to a heat recovery steam generator (HRSG), and an angle of a first central axis of the radial diffuser portion at the outlet of the axial-radial diffuser is between 40 to 70 degrees.

25. The system of claim 24, wherein a top wall of the transition duct progressively increases in angle relative to a second central axis of the transition duct from a first axial end portion to a second axial end portion of the transition duct.

26. A system, comprising:
an exhaust diffuser system, comprising:
an axial-radial diffuser comprising:
an inlet configured to couple to a gas turbine system;

an outlet;
an axial diffuser portion between the inlet and the outlet, wherein the axial diffuser portion comprises a first central hub having a first inner wall disposed about a central axis, a first outer wall disposed about the first inner wall, and a first exhaust passage between the first inner and outer walls; and
a radial diffuser portion between the axial diffuser portion and the outlet, wherein the radial diffuser portion increases in cross-sectional area in a flow direction toward the outlet, wherein the radial diffuser portion comprises a second central hub having a second inner wall disposed about the central axis, a second outer wall disposed about the second inner wall, and a second exhaust passage between the second inner and outer walls and fluidly coupled to the first exhaust passage, wherein the radial diffuser portion turns outward away from the central axis from the axial diffuser portion to the outlet;
a transition duct coupled to the axial-radial diffuser, wherein the outlet is disposed inside of an intake portion of the transition duct, and the transition duct comprises a discharge portion configured to couple to a heat recovery steam generator (HRSG); and
a support structure extending from the radial diffuser portion to a base, wherein the support structure comprises first and second supports extending from the second central hub to the base.

27. A system, comprising:
an exhaust diffuser system, comprising:
an axial-radial diffuser comprising:
an inlet configured to couple to a gas turbine system;
an outlet;
an axial diffuser portion between the inlet and the outlet, wherein the axial diffuser portion comprises a first central hub having a first inner wall disposed about a central axis, a first outer wall disposed about the first inner wall, and a first exhaust passage between the first inner and outer walls; and
a radial diffuser portion between the axial diffuser portion and the outlet, wherein the radial diffuser portion increases in cross-sectional area in a flow direction toward the outlet, wherein the radial diffuser portion comprises a second central hub having a second inner wall disposed about the central axis, a second outer wall disposed about the second inner wall, and a second exhaust passage between the second inner and outer walls and fluidly coupled to the first exhaust passage, wherein the radial diffuser portion turns outward away from the central axis from the axial diffuser portion to the outlet, wherein the second inner wall of the second central hub comprises a perforated wall portion; and
a transition duct coupled to the axial-radial diffuser, wherein the outlet is disposed inside of an intake portion of the transition duct, and the transition duct comprises a discharge portion configured to couple to a heat recovery steam generator (HRSG).

28. The system of claim 27, wherein the second central hub is coupled to a drive of a flow passage area adjustment system, and the drive is configured to move the second central hub to adjust flow between the second inner and outer walls.

* * * * *